(12) United States Patent
Viger et al.

(10) Patent No.: US 8,072,898 B2
(45) Date of Patent: Dec. 6, 2011

(54) METHOD FOR MANAGING A TRANSMISSION OF DATA STREAMS ON A TRANSPORT CHANNEL OF A TUNNEL, CORRESPONDING TUNNEL END-POINT AND COMPUTER-READABLE STORAGE MEDIUM

(75) Inventors: Pascal Viger, Coesmes (FR); Stéphane Baron, Le Rheu (FR)

(73) Assignee: Canon Kabushiki Kaisha, Tokyo (JP)

( * ) Notice: Subject to any disclaimer, the term of this patent is extended or adjusted under 35 U.S.C. 154(b) by 155 days.

(21) Appl. No.: 12/488,402

(22) Filed: Jun. 19, 2009

(65) Prior Publication Data
US 2010/0008245 A1    Jan. 14, 2010

(30) Foreign Application Priority Data
Jul. 11, 2008    (FR) ..................................... 08 54784

(51) Int. Cl.
*H04L 12/26*    (2006.01)
(52) U.S. Cl. ...................................................... 370/252
(58) Field of Classification Search .......... 370/229–235, 370/389, 394, 395.5–395.52, 464–465, 469–476
See application file for complete search history.

(56) References Cited

U.S. PATENT DOCUMENTS

| | | | | |
|---|---|---|---|---|
| 6,208,620 B1 * | 3/2001 | Sen et al. | ...................... | 370/231 |
| 6,934,257 B2 * | 8/2005 | Liu et al. | ...................... | 370/236 |
| 7,089,312 B2 * | 8/2006 | Liu et al. | ...................... | 709/227 |
| 7,213,077 B2 * | 5/2007 | Border | ........................ | 709/234 |
| 7,398,552 B2 * | 7/2008 | Pardee et al. | ................... | 726/15 |
| 7,656,799 B2 * | 2/2010 | Samuels et al. | ............... | 370/231 |
| 7,760,642 B2 * | 7/2010 | Plamondon | ................... | 370/235 |
| 2003/0219022 A1 | 11/2003 | Dillon et al. | | |
| 2005/0198118 A1 | 9/2005 | Viger et al. | | |

(Continued)

FOREIGN PATENT DOCUMENTS

| JP | 2001-36586 | 2/2001 |
|---|---|---|
| JP | 2008-78966 | 4/2008 |

OTHER PUBLICATIONS

Kim et al, Considering Spurious Timeout in Proxy for Improving TCP Performance in Wireless Networks, IEEE, 3 pages, Jan. 2004.*

(Continued)

*Primary Examiner* — Frank Duong
(74) *Attorney, Agent, or Firm* — Fitzpatrick, Cella, Harper & Scinto

(57) ABSTRACT

A method is proposed for managing a transmission of data streams on a transport channel of a tunnel, the transmission of each stream being performed on the transport channel according to a transport protocol scheduled by packets and with acknowledgment, the tunnel being implemented between a first and a second tunnel end-point connected respectively to a first and a second sub-network, each stream being transmitted from a sender device to a receiver device, one device among the sender device and the receiver device being connected to the first sub-network and the other to the second sub-network. The method is performed by the first tunnel end-point and comprises the following steps: detecting a loss of packet on the transport channel of the tunnel; identifying at least one stream having at least one packet blocked on the transport channel of the tunnel by the loss; for at least one identified stream, generating and transmitting at least one acknowledgment to the sender device that has transmitted, on the tunnel, a packet blocked by said loss.

19 Claims, 10 Drawing Sheets

U.S. PATENT DOCUMENTS

2006/0002301 A1    1/2006   Liu et al.
2009/0034416 A1    2/2009   Baron et al.
2009/0213850 A1    8/2009   Viger et al.

OTHER PUBLICATIONS

J. Border, et al. "Performance Enhancing Proxies; draft-ietf-pilc-pep-02.txt", Internet Engineering Task Force, Mar. 10, 2003.

Yamanegi, K. et al., "Implementation Experiments of the TCP Proxy Mechanism", Information and Telecommunication Technologies, Nov. 9, 2005, pp. 17-22.

M. Elaoud, et al. "TCP-SMART: a technique for improving TCP performance in a spottywide band environment", IEEE Communications, 2000. Icc 2000, vol. 3, pp. 1783-1787.

* cited by examiner

METHOD FOR MANAGING A TRANSMISSION OF DATA STREAMS ON A TRANSPORT CHANNEL OF A TUNNEL, CORRESPONDING TUNNEL END-POINT AND COMPUTER-READABLE STORAGE MEDIUM

1. FIELD OF THE INVENTION

The field of the invention is that of communications networks.

More specifically, the invention relates to a technique of management of a transmission of data streams on a transport channel of a tunnel supported by a main communications network.

The democratization of high-bit-rate Internet on the one hand and the emergence of consumer audiovisual equipment having network connectivity on the other hand is going to create new forms of user behavior. These new forms of behavior will undoubtedly involve the emergence of individuals belonging to common-interest groups (i.e. common interests such as leisure, family, etc) that we might call "permanently linked" groups. These groups will set up almost permanent connections with other individuals having a same field of interest, setting up audio and/or video communications and sharing all kinds of information (audio, video, photo, text etc).

The technology of Virtual Private Networks (VPN) is offering a worthwhile solution to this demand. This technology enables real-time, transparent and secured communication between individuals who share a same field of interest and at the same time use the Internet infrastructure which has low reliability but is inexpensive.

To communicate transparently and overcome the need for non-routable addresses, VPNs use a particular type of encapsulation known as tunneling which creates what is called a tunnel. This operation consists in encapsulating an A-level protocol (an embedded or conveyed or passenger protocol) in a B-level protocol (transport or conveying protocol) by means of an encapsulation protocol C. Thus, the transport protocol B processes the passenger protocol A as if it is were payload data.

FIG. 3, described in detail here below, presents an example of packet encapsulation in a level-2 VPN, i.e. encapsulation in a level-2 tunnel (a level-2 tunnel means that the passenger protocol is a protocol of the layer 2 of the ISO model which describes the services offered by each of these layers and their interactions).

Tunneling can be used to transport a network protocol on a network that does not support it. It can also be used to provide different types of VPN functions such as for example private addressing.

Tunneling techniques are now increasingly used by functions entailing remote client access and home local area networks (LANs).

Here below in the description, we consider, purely by way of an example, level-2 or level-3 tunnels for which the level of the transport protocol B in the OSI model is equal to that of the transport layer (level-4 transport layer in the ISO model). It is clear that the context of the present invention is in no way exhaustive and that the level of the transport protocol B in the OSI model may be lower (in the case of a tunnel with Ethernet carrier) or higher (in the case of a time and with HTTP carrier).

Tunneling techniques are frequently used to interconnect two LANs in order to create a virtual private network (VPN) formed by the union of two original LANs. Secured VPNs include a cryptography and authentication algorithm to guarantee the secrecy of the transported data. A typical VPN configuration based on a tunneling technique is illustrated in FIG. 1 (described in detail here below). In this example, the tunnel end-points (TEPs) are not integrated into the gateways. The tunnel is set up between two tunnel end-points and each packet (also called a frame) sent to an apparatus connected to the remote LAN is encapsulated by the local tunnel end-point and then sent to the remote tunnel end-point which will de-encapsulate it and send it to the remote LAN. From the viewpoint of the apparatuses of the LANs interconnected by a tunnel, they are virtually connected to a same LAN. A communication between two apparatuses through the tunnel is called end-to-end communication because the use of the tunnel is transparent for the apparatuses of the connected LANs.

In the prior art, it is chiefly the IP or Internet protocol (layer 3) or the TCP (transmission control protocol)/UDP (user datagram protocol) (layer 4) that is used. Since IP-based tunneling technologies cannot take account of the network address translation (NAT) mechanism and since they are not entirely compatible with the typical tunneling configuration of FIG. 1, the rest of the description here below considers (solely as examples) solutions based on the layer-4 (transport layer) i.e. on the TCP or the UDP.

As explained in the Appendix which presents the principles of operation of the TCP protocol, the TCP protocol (defined by the IETF standard RFC793) is an ARQ (Automatic Repeat Request) type of protocol that is based on congestion control and retransmission mechanisms, and thus ensures delivery of each packet to its destination.

The UDP protocol is a far simpler and faster protocol that does not take account of the order of the frames and does not manage acknowledgment.

As specified here above, the TCP protocol was designed to be flexible and work in a wide range of network communications environments including slow and fast links, with high latency, or links with variable error rates. Although the TCP protocol works for different environments, these performance levels (especially the bandwidth) are affected by the characteristics of each communications link used. The performance of the TCP protocol in terms of bandwidth suffers in environments that have lengthy routing times and/or possess a high error rate.

An advanced proxy concept or PEP (proxy enhanced protocol) type of concept based on the RFC 3135 standard can be used to improve the performance of the infrastructures. The RFC 3135 standard describes different types of mechanisms for the improvement of data stream transmission (called PEP mechanism here below) embedded in network apparatuses on the routing path of a TCP stream between a server and a client. As shall be described here below, PEP systems are particularized for each environment in order to act on the control of TCP stream congestion accordingly.

In the case of the Internet, the connections are normally of the "best effort" type, i.e. these connections do everything possible to convey the information up to their destination but do so without guaranteeing a certain level of quality of service (QoS). Thus, in the context of VPN communications, the transport layer of the tunnel is subjected to high fluctuations in transmission capacity.

The passenger TCP streams of this tunnel conventionally perform an end-to-end congestion control, i.e. the two communications devices work together in the determining of the bit rate at which data must be send from the server device (also called a sender device here below) to the client device (also called a receiver device here below). However, the sender device has information available on the conditions of transportation of the stream in the tunnel, this tunnel, this tunnel being transparent from the viewpoints of the sender and receiver devices. The information obtained through the end-to-end congestion control set up with the receiver device can then lead to decisions taken by the sender device that are unsuited to the conditions of transportation on the tunnel and that result in an increase in bandwidth consumption through unnecessary retransmission or under-utilization of the available bandwidth.

PEP mechanisms can be set up in order to influence the congestion control for the passenger TCP streams from the tunnel in accordance with the intrinsic limitations of this tunnel at a given point in time.

2. TECHNOLOGICAL BACKGROUND

2.1 Description of the Problem

During a temporary congestion of the VPN tunnel in a wide area network (here below called a WAN) such as the Internet for example, the carrier of this tunnel (i.e. for example a transportation channel of this tunnel according to the TCP protocol) using a reliable acknowledgment-based communications protocol will enter into automatic re-transmission. This will have the effect of suspending all the streams conveyed in this transportation channel of the tunnel (even those that are not directly concerned by the loss of the encapsulation, packet i.e. embedding packet of the tunnel carrier). Indeed, several passenger streams can be conveyed by a same transport channel (i.e. a same communications session) of the tunnel. Furthermore, by construction, the TCP protocol guarantees the order of arrival of the packets and does not give the packets of the tunnel that follow the lost packet of this tunnel to the receiver entity (in this case the remote tunnel end-point) in advance. In other words, there will be no transfer to the remote LAN of the received passenger packets for which the data sequence number of the carrier is greater than the number corresponding to the lost packet of the tunnel. The unblocking of these stored packets will be done only once the lost packet has been re-transmitted by the sender tunnel end-point and received by the receiver tunnel end-point.

It can be seen that the phase of re-transmission of the lost packet has necessitated a round-trip time or RTT) on the tunnel that is supplementary to the classic data/acknowledgment (DATA/ACK) transfer phase for a packet.

Since the RTT on an Internet tunnel is very high (10 to 100 times that of a LAN), it is clear that this RTT very greatly conditions the behavior of the connections conveyed by the tunnel (i.e. connections that are passengers of the tunnel) between remote clients and servers.

Thus, during a temporary congestion of the VPN, all the passenger connections are subjected to a delay of twice the RTT of the tunnel, i.e. a delay close to the critical value of the retransmission time-out (here below called an RTO) for these connections.

Depending on the fluctuations of the WAN, it can be seen that the TCP servers broadcasting on the VPN tunnel section undergo an expiry of their RTO producing a collapse of their transmission bit rate. It can be recalled that an increase in the bit rate of these servers directly depends on the time taken for conveyance to the recipient (RTT) inasmuch as the greater the delay, the greater will be the time taken to recover the initial transmission bit rate before collapse. Furthermore, despite the takeover of a re-transmission in the tunnel for the lost encapsulating packet, a re-transmission is also done by the TCP server sending the passenger stream of the tunnel.

In conclusion, the smallest loss on the TCP tunnel has a devastating effect on end-to-end performance of the TCP connections embedded in this tunnel.

The PEP mechanisms are applied chiefly to congestion control and to the problems of re-transmission on the different network segments taken by a TCP type connection. In order to overcome the above-mentioned problem of a loss of encapsulating packets (WAN packets) on the carrier (TCP transport channel) of the tunnel, the PEP mechanisms based on the temporary storage or buffering of packets can store more data in their cache memory. However, this has a limited effect in time.

At the most, these PEP mechanisms can delay the time-out phenomenon for connections carried by the tunnel, but this is not sufficient.

It is therefore necessary, and this is an essential preoccupation of the invention, to overcome this problem of RTO time-out of the connections conveyed in the temporarily congested TCP tunnel and thus propose an efficient method for the control of the transmission bit rate of a TCP server conveying a digital content traveling through this tunnel, from a local LAN to a remote LAN.

2.2 Prior Art

There are two categories of principles for the improvement of TCP performance in an unstable environment (such as the Internet or wireless links): end-to-end protocols and split-connections protocols. The latter category cannot be considered for our problem because its protocols violate the intrinsic principle of tunneling that supports end-to-end client TCP connections: the principle of this latter category of protocols is that it has its own characterized connection for each portion of a heterogeneous network.

Most end-to-end connection protocol principles rely on the addition of a PEP (Performance Enhanced Proxy) type specialized agent in the infrastructure equipment between the heterogeneous type networks (typically tunnel end-points for WANs or base stations for wireless networks).

Two prior-art techniques, enabling certain effects of a TCP on TCP tunneling to be overcome shall now be discussed.

A first prior-art technique is described in the patent document US2006/0002301 A1 (INTEL CORP. US, "Transferring TCP Packets"). This patent document is situated in the context of a TCP tunnel connecting two remote LANs with TCP connections set up between apparatuses of these two LANs through this tunnel.

In order to avoid a double re-transmission of data when there is a loss in the tunnel (corresponding to one re-transmission by the tunnel carrier, and another by the passenger TCP stream), it is proposed to implement a PEP temporary storage mechanism on each tunnel end-point, furthermore enabling an exchange, between the two tunnel end-points, of information pertaining to the packets effectively received on either side. In a first prior art exchange, a loss on the tunnel is concealed from the apparatuses of the LANs by the combination of the following effects: first of all, an automatic re-transmission takes place in the tunnel for the lost piece of data and secondly the temporary storage partly masks the delay needed for this re-transmission.

This eliminates end-to-end re-transmissions (passenger TCP streams) to the benefit of a single re-transmission by the tunnel carrier. The cache memory available thus provides for local management on each network segment (local LAN, WAN, remote LAN) of the re-transmissions. This mechanism copes with problems of performance on the tunnel when there is a loss on this tunnel (efficient use of bandwidth of the tunnel solely at necessary re-transmissions) and when there are losses on the remote network (local re-transmission).

However, the proposed mechanism does not resolve the effect of an RTO time-out of a local LAN waiting for an acknowledgment of its data by a remote client (connected to the remote LAN).

It is vain to hope that the temporary storage zone, as implemented in the first prior-art technique, also masks a loss on the WAN in terms of transmission time. At most, a fluctuation of the time taken to convey packets from the temporary storage zone (in each tunnel end-point) could lengthen the perception of the RTO by the TCP server (not documented in the above-mentioned patent document).

A second prior-art technique is described in the following IEEE article: Elaoud, M.; Ramanathan, P, "TCP-SMART: a technique for improving TCP performance in a spotty wide band environment", (IEEE Communications, 2000. ICC 2000; Page(s):1783-1787 vol. 3; Digital Object Identifier 10.1109/ICC.2000.853814).

This article describes a snoop type mechanism responsible for carrying out local re-transmission and a filtering of duplicate acknowledgments or duplicate ACKs in order to improve the performance of an end-to-end TCP connection traveling through an unstable environment (in a wireless link where breaks in the link are frequent).

This second prior-art technique is aimed at reducing the number of expiries of the RTO of the server during breaks in the wireless link, these breaks preventing the arrival of acknowledgments from the remote TCP client.

The PEP agent at the wireless base station analyses each TCP connection and temporarily stores the data to be sent out on the wireless link. When an acknowledgment of this data is received by the agent from the remote TCP client, these packets are eliminated from the cache. If no acknowledgment is received during a certain period of time or if an indication of error is received (duplicate acknowledgments or duplicate ACKs), these pieces of data are re-transmitted to the client. This is the behavior of a classic PEP storage mechanism.

This second prior-art technique also adds a function for the generation of a duplicate acknowledgment (duplicate ACK) intended for the TCP server of the wire network with an "acknowledgment window" or "advertised window" field at 0, in order to stop transmission from the TCP. The TCP server is then in suspended mode, pending new acknowledgments from the client (with an advertised window field strictly greater than 0) to release it from this mode.

This second prior-art technique is aimed at resolving the same problem as the invention (namely at preventing the phenomenon of expiry of the RTO of the TCP servers) in the context of a communication call on a discontinuous wireless link which however is not adapted to the WAN environments where the RTT is far greater. Indeed, the principle of stopping a server in transmission to prevent congestion of the buffers during more or less lengthy physical disconnections of the wireless carrier seems to be worthwhile in the case of communications on a discontinuous wireless link but is not worthwhile in the case of a VPN tunnel where a loss limited to one packet in no way signifies a stopping of this tunnel (furthermore, the tunnel remains active because it re-transmits the lost data). It may be recalled that the speeds of conveyance on a WAN (on which the tunnel is set up) are far smaller than they are on a LAN or a WLAN (wireless LAN) and that the under-utilization of the capacities of the WAN is costly in terms of conveyance time.

As presented here above, the prior-art PEP mechanisms are prepared chiefly on the principle of temporary data storage. This implies substantial memory resources in the context of transmission on a WAN (on which the tunnel is set up) since the data has to be stored for a duration of at least 2 RTT. This is all the more damaging to a TCP VPN tunnel as it is certain that the carrier of the tunnel will automatically take responsibility for re-transmitting stray packets on the WAN on which the tunnel is set up. The device proposed by the second prior-art technique is more elaborate but is not adapted to deriving the best possible advantage from the transmission capacities of a TCP tunnel on the Internet.

The prior art therefore does not have any technique that is low cost in terms of resources and enables mastery of the internal TCP management control for a TCP server that is transparent for the server and the client (complying with the above-mentioned principles of end-to-end TCP connection) and is adapted to sporadic losses in a VPN tunnel.

3. GOALS OF THE INVENTION

The invention in at least one embodiment is aimed especially at overcoming these different drawbacks of the prior art.

More specifically, it is a goal of at least one embodiment of the invention to provide a technique for the management of a data stream transmission on a transportation channel of a tunnel by which it is possible to control the management of the transmission bit rate of one or more transmitter devices (TCP servers for example), at the detection of congestion on this tunnel (the passage of the tunnel into a re-transmission phase following a loss of data and/or during a one-time increase in the latency of this tunnel) enabling a minimum limitation of the bandwidth of the transmission stream from these servers.

At least one embodiment of the invention is also aimed at providing a technique of this kind that does not call for any modification of the TCP/IP stacks for example of the sender (server) and receiver (client) devices.

It is yet another goal of at least one embodiment of the invention to provide a technique of this kind that is entirely transparent for sender (server) and receiver (client) devices.

It is yet another goal of at least one embodiment of the invention to provide a technique of this kind that calls for limited memory resources.

It is an additional goal of at least one embodiment of the invention to provide a technique of this kind that is simple to implement and costs little.

4. SUMMARY OF THE INVENTION

One particular embodiment of the invention proposes a method for managing a transmission of data streams on a transport channel of a tunnel, the transmission of each stream being performed on said transport channel according to a transport protocol scheduled by packets and with acknowledgment, the tunnel being implemented between a first and a second tunnel end-point connected respectively to a first and a second sub-network, each stream being transmitted from a sender device to a receiver device, one device among said sender device and said receiver device being connected to the first sub-network and the other to the second sub-network, said method being performed by said first tunnel end-point and comprising the following steps:
  detecting a loss of packet on the transport channel of the tunnel;
  identifying at least one stream having at least one packet blocked on the transport channel of the tunnel by said loss;

generating and transmitting, for at least one identified stream, at least one acknowledgment to the sender device that has transmitted, on the tunnel, a packet blocked by said loss.

Thus, in this particular embodiment, the invention relies on a wholly novel and inventive approach in which a preventive corrective (the generation of "fictitious" acknowledgments by the tunnel input tunnel end-point) is applied to prevent the phenomenon of expiry of the RTO of the sender devices (servers).

Thus, instead of stopping the sender devices, as in the second prior-art technique, they are allowed to believe that the conveyance of the data sent is under control and that they can continue to transmit the rest of the data.

The bandwidth of the tunnel is saved for the payload data: cancellation of automatic re-transmission of passenger streams of the tunnel (moreover, often in bursts).

This technique is entirely transparent for the sender devices (servers) and receiver devices (clients). There is no modification of the protocol stacks for example TCP/IP protocol stacks of the sender devices (servers) and receiver devices (clients).

This technique necessitates limited memory resources since there is no possible memory overflow (because of the PEP storage mechanism).

Advantageously, for at least one given identified stream, said at least one generated acknowledgment is an acknowledgment of the packet that precedes the first packet, which is blocked by said loss, of said identified stream. For the identified stream to which the packet whose loss has been detected belongs, the first packet blocked by said loss is considered to be a packet re-transmitted on the transport channel of the tunnel following the detection of the loss.

Thus, the transmission of the acknowledgments generated by the first tunnel end-point informs the sender devices that receive them that the connection is still valid and that there is no particular problem other than a delay in the conveyance of a packet for each stream concerned.

Advantageously, for at least one given identified stream, said step of generating and transmitting at least one acknowledgment comprises the following steps:
determining a first sending instant t1 of sending a first acknowledgment, as a function of an estimation of the duration of a re-transmission time-out associated with the sender device transmitting said given identified stream, and as a function of a processing instant of processing, by said tunnel end-point, of said packet that precedes the first packet of said identified stream which is blocked by said loss;
transmitting said first acknowledgment at said first sending instant t1.

Thus, the corrective is made specific for each sender device. Indeed, it depends on the characteristics of the stream concerned as well as its activity in the tunnel.

Advantageously, said first sending instant t1 is defined by: $t1=t0+RTO'-\Delta$, where:
t0 is said processing instant of processing, in said first tunnel end-point, of said packet that precedes the first packet of said identified stream which is blocked by said loss;
RTO' is said estimation of a duration of the re-transmission time-out associated with the sender device transmitting said given identified stream;
$\Delta$ is a pre-determined safety margin.

Thus, the first sending instant t1 is simple to determine.

Advantageously, for at least one given identified stream, said step of generating and transmitting of at least one acknowledgment comprises at least one iteration of the following steps:
determining a new sending instant t2 of sending a new acknowledgment, defined by: $t2=t1+RTO'-\Delta$, where t1 is said first sending instant, for the first iteration, or the new sending instant t2 determined at the preceding iteration, for each iteration starting with the second iteration;
transmitting said new acknowledgment at said new sending instant t2.

Thus, as a precaution, it is sought to generate another acknowledgment, in the first tunnel end-point, for a given identified stream. The first acknowledgment generated by the first tunnel end-point mitigates the effects of a simple loss of packet on the tunnel but it is necessary to envisage a case where a tunnel must have a duration greater than one RTT is necessary in order to get restored.

Thus, each new sending instant t2 can be easily determined. Again, the corrective is made specific to each sender device.

Advantageously: $RTO'=2*RTT$ with RTT being a measurement of a round-trip duration of the tunnel.

Thus, the computation is simplified. It will be noted that the duration of an RTT between a sender device and a receiver device is approximated by the duration of an RTT of the tunnel, because the RTT of the tunnel is far greater than the RTT of a LAN.

Advantageously, for at least one given identified stream, in said step of generating and transmitting at least one acknowledgment, an acknowledgment is generated and transmitted only if the following first condition is verified: the number of packets of said given identified stream, which are in transit on the transport channel of the tunnel and blocked by said loss, is greater than a number of acknowledgments generated and transmitted by said first tunnel end-point for said given identified stream.

This first condition ensures transparency for the sender device (server) in guaranteeing compliance with the transport protocol ordered by packet and with acknowledgment (for example the TCP protocol) since the sender device does not receive any more acknowledgments than packets that it has sent (in TCP for example, an acknowledgment can be generated by the client only in response to a packet transmitted by the server).

Advantageously, for at least one given identified stream, in said step of generating and transmitting of at least one acknowledgment, an acknowledgment is generated and transmitted only if the following second condition is verified: a number of acknowledgments generated and transmitted by said first tunnel end-point, for said given identified stream, is smaller than or equal to a pre-determined threshold indicating a packet loss for the sender device transmitting said given identified stream.

Thus, the invention prevents the sender device (server) from interpreting the generation of successive acknowledgments generated by the first tunnel end-point as a packet loss, and therefore prevents the sender device from re-transmitting the packet assumed to be lost.

According to an advantageous characteristic, for at least one given identified stream, the method comprises a step of filtering acknowledgments coming via the tunnel, from the receiver device of said given identified stream, for which said first tunnel end-point has already generated and transmitted an acknowledgment.

Thus, the secondary effects induced by the generation of fictitious acknowledgments by the first tunnel end-point are managed so as not to disturb the state machine of the connection in progress, on the sender device (server). For example, if the remote receiver device (client) sends out a "true" duplicate acknowledgment (duplicate ACK) due to a light de-sequencing on the remote LAN, and if the first tunnel end-point has already generated and sent out one or two "fictitious" duplicate acknowledgments, it is necessary to filter (i.e. detect and destroy) this "true" duplicate acknowledgment so that the sender device (server) does not receive a third duplicate acknowledgment which would then cause it to be positioned in a re-transmission mode (with a drop in the TCP sender window function which is to be avoided).

In another embodiment, the invention pertains to a computer program product downloadable from a communications network and/or recorded on a computer-readable carrier and/or executable by a processor. This computer program product comprises program code instructions for the implementation of the above-mentioned method (in one of its different embodiments) when said program is executed on a computer.

In another embodiment, the invention relates to a computer-readable storage medium, storing a computer program comprising a set of instructions executable by a computer in order to implement the above-mentioned method (in any one of its different embodiments).

In one particular embodiment, the invention proposes a first tunnel end-point enabling the management of a transmission of data streams on a transport channel of a tunnel, the transmission of each stream being performed on said transport channel according to a transport protocol scheduled by packets and with acknowledgment, the tunnel being implemented between said first tunnel end-point and a second tunnel end-point connected respectively to a first and a second sub-network, each stream being transmitted from a sender device to a receiver device, one device among said sender device and said receiver device being connected to the first sub-network and the other to the second sub-network. Said first tunnel-end-point comprises:
- means for detecting a loss of packet on the transport channel of the tunnel;
- means for identifying at least one stream having at least one packet blocked on the transport channel of the tunnel by said loss;
- means for generating and transmitting, for at least one identified stream, at least one acknowledgment to the sender device that has transmitted, on the tunnel, a packet blocked by said loss.

Advantageously, for at least one given identified stream, said at least one generated acknowledgment is an acknowledgment of the packet that precedes the first packet, which is blocked by said loss, of said identified stream. For the identified stream to which the packet whose loss has been detected belongs, the first packet blocked by said loss is considered to be a packet re-transmitted on the transport channel of the tunnel following the detection of the loss.

Advantageously, said means for generating and transmitting at least one acknowledgment comprise:
- means for determining, for at least one given identified stream, a first sending instant t1 of sending a first acknowledgment, as a function of an estimation of the duration of a re-transmission time-out associated with the sender device transmitting said given identified stream, and as a function of a processing instant of processing, by said tunnel end-point, of said packet that precedes the first packet of said identified stream which is blocked by said loss;
- means for transmitting said first acknowledgment at said first sending instant t1.

Thus, the corrective is made specific for each sender device. Indeed, it depends on the characteristics of the stream concerned as well as its activity in the tunnel.

Advantageously, said first sending instant t1 is defined by: $t1=t0+RTO'-\Delta$, where:
- t0 is said processing instant of processing, in said first tunnel end-point, of said packet that precedes the first packet of said identified stream which is blocked by said loss;
- RTO' is said estimation of a duration of the re-transmission time-out associated with the sender device transmitting said given identified stream;
- $\Delta$ is a pre-determined safety margin.

Advantageously, said means for generating and transmitting at least one acknowledgment comprise the following means, activated at least once:
- means for determining, for at least one identified stream, a new sending instant t2 of sending a new acknowledgment, defined by: $t2=t1+RTO'-\Delta$, where t1 is said first sending instant, for the first iteration, or the new sending instant t2 determined at the preceding iteration, for each iteration starting with the second iteration;
- means for transmitting said new acknowledgment at said new sending instant t2.

Advantageously: $RTO'=2*RTT$ with RTT being a measurement of a round-trip duration of the tunnel.

Advantageously, the first tunnel end-point comprises:
first verifying means, for verifying the following first condition for at least one given identified stream: the number of packets of said given identified stream, which are in transit on the transport channel of the tunnel and blocked by said loss, is greater than a number of acknowledgments generated and transmitted by said first tunnel end-point for said given identified stream;
means for activating said means for generating and transmitting at least one acknowledgment, for said at least one given identified stream, if said first verifying means make a positive verification.

Advantageously, the first tunnel end-point comprises:
second verifying means, for verifying the following second condition for at least one given identified stream: a number of acknowledgments generated and transmitted by said first tunnel end-point, for said given identified stream, is smaller than or equal to a pre-determined threshold indicating a packet loss for the sender device transmitting said given identified stream;
means for activating said means for generating and transmitting at least one acknowledgment, for said at least one given identified stream, if said second verifying means make a positive verification.

According to an advantageous characteristic, the first tunnel end-point comprises means, for at least one given identified stream, of filtering the acknowledgments coming via the tunnel, from the receiver device of said given identified stream, for which said first tunnel end-point has already generated and transmitted an acknowledgment.

5. LIST OF FIGURES

Other features and advantages of embodiments of the invention shall appear from the following description, given by way of an indicative and non-exhaustive example, and from the appended drawings, of which:

Figure 6:
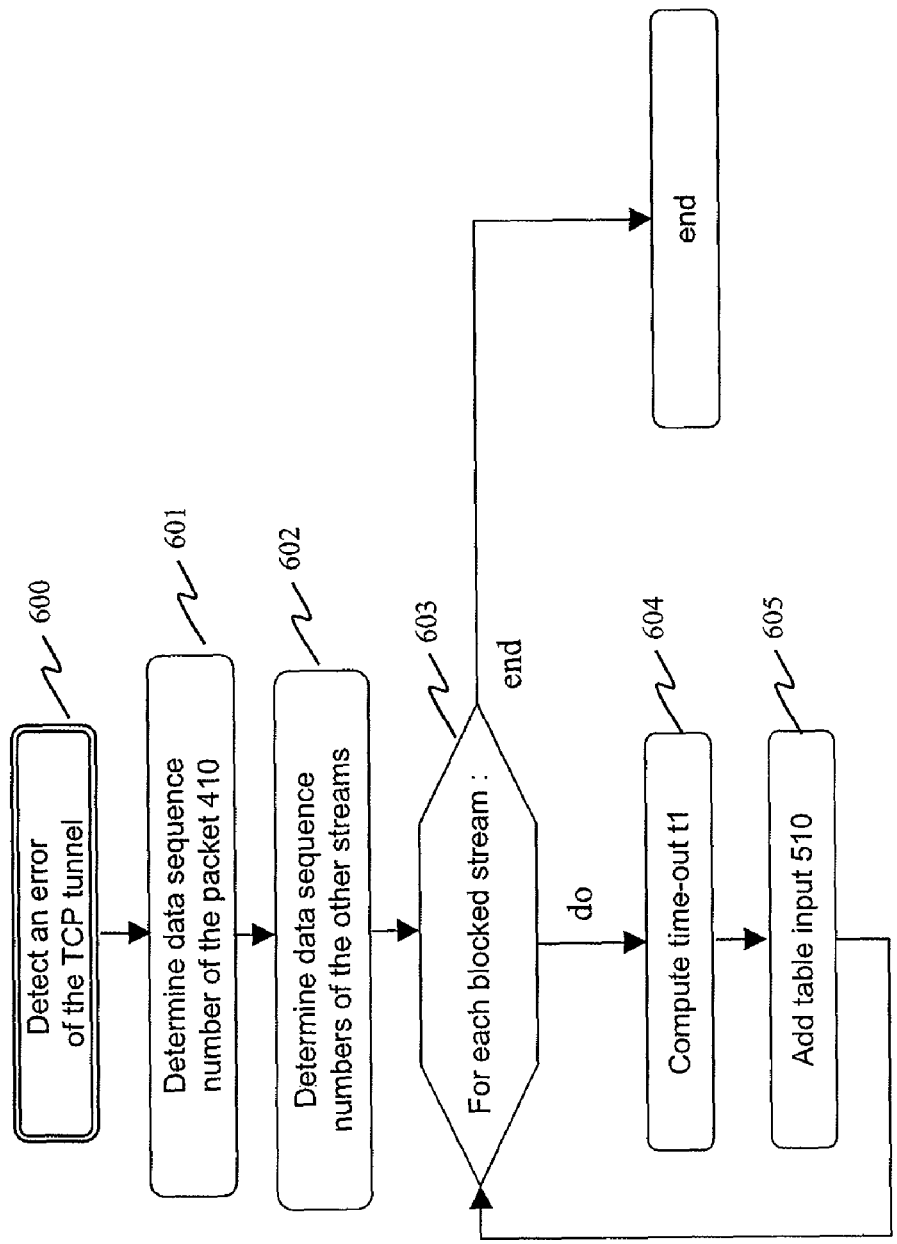
Figure 7:
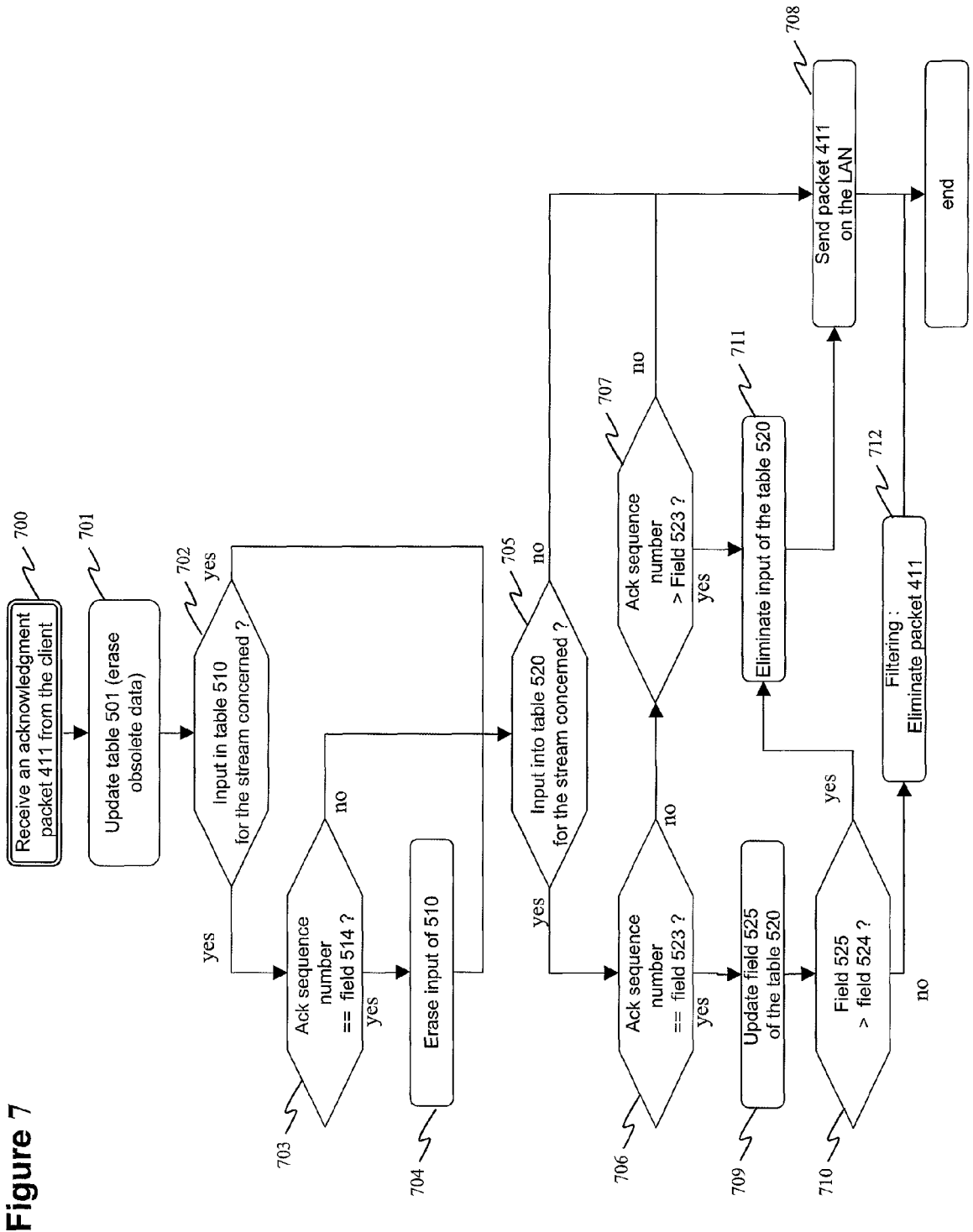
Figure 8:
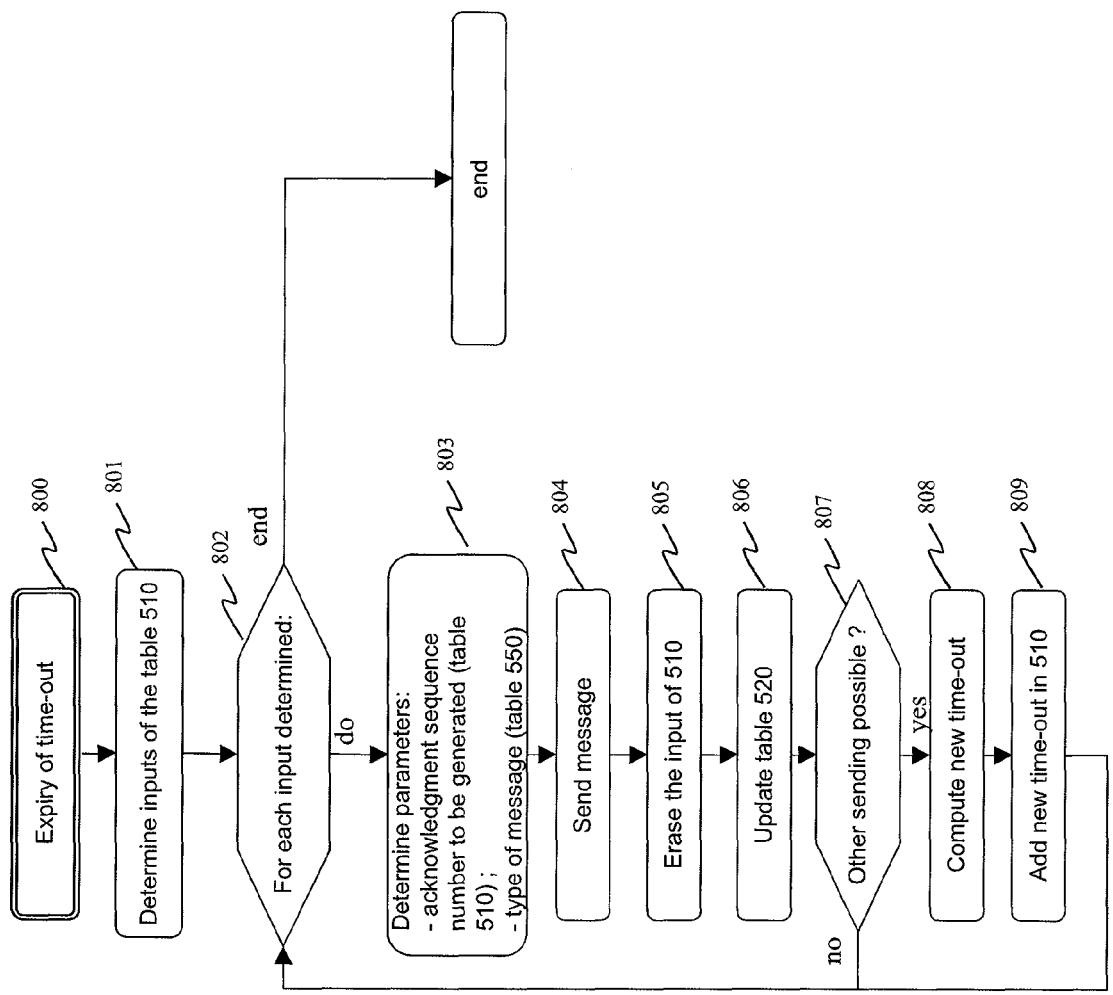
Figure 9:
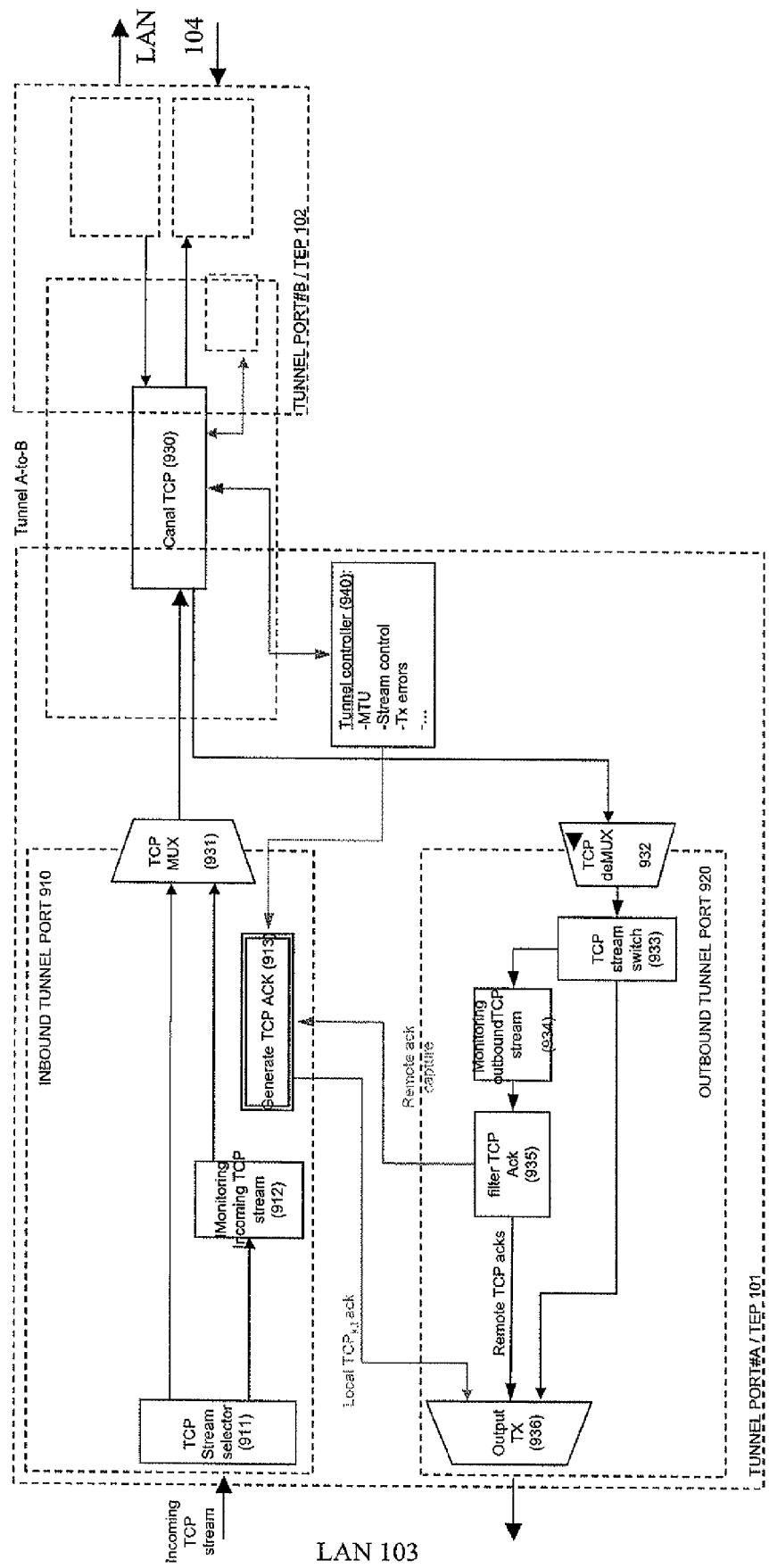
Figure 10:
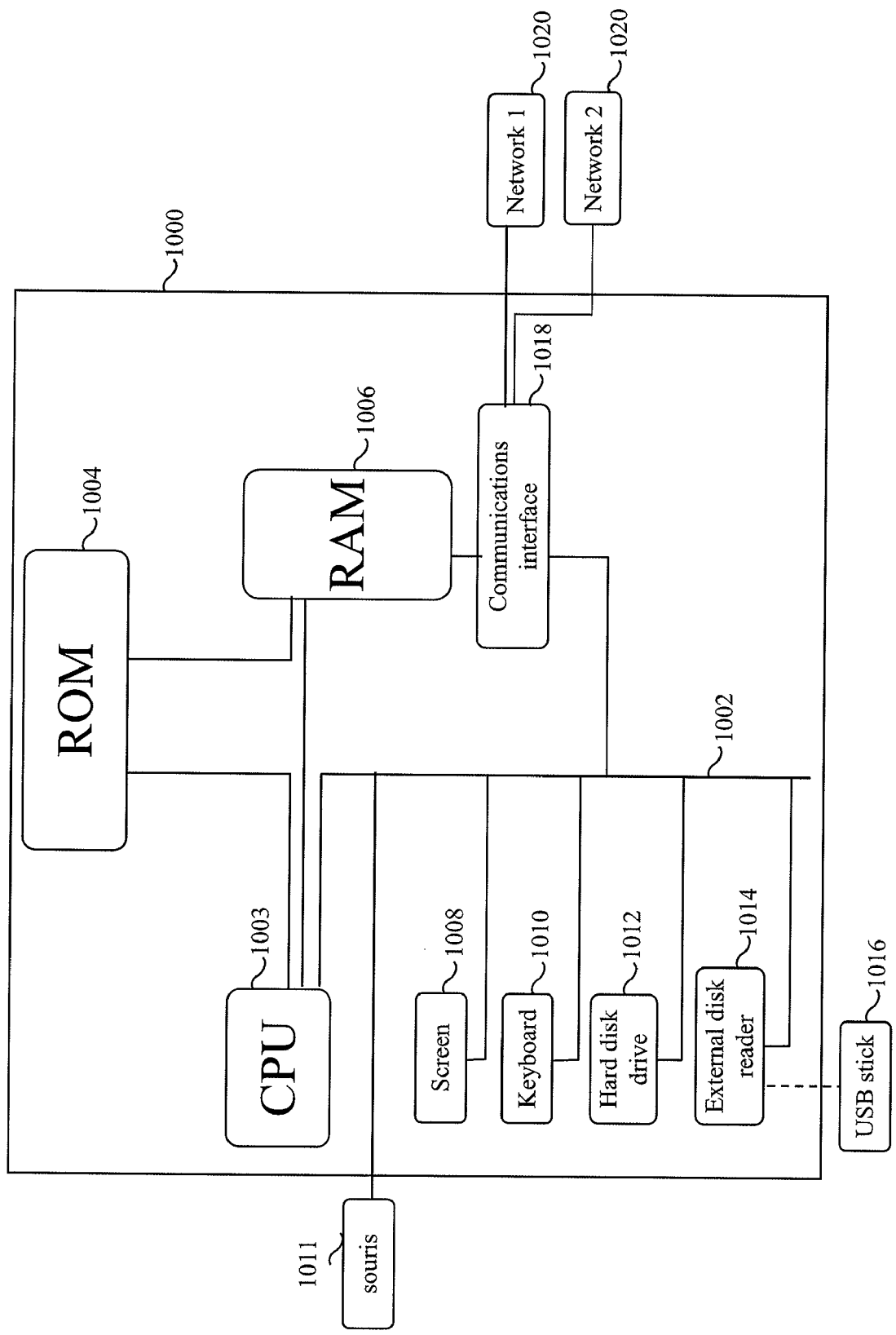

FIG. 6 presents an algorithm executed upon detection of a transmission error of the tunnel, this algorithm being included in a particular embodiment of the corrective method of the invention;

FIG. 7 shows an algorithm executed upon reception of an acknowledgment coming from the tunnel for a passenger TCP stream of this tunnel, this algorithm being included in a particular embodiment of the corrective method of the invention;

FIG. 8 shows an algorithm for the generation and sending of an acknowledgment message to the server, this algorithm being included in a particular embodiment of the corrective method of the invention;

FIG. 9 provides a schematic view of a functional architecture of a PEP system of a tunnel end-point 101 implementing the algorithms of a particular embodiment of the invention;

FIG. 10 illustrates a schematic configuration of a generic communications device adapted to implementing a particular embodiment of the invention.

6. DETAILED DESCRIPTION

In all the figures of the present invention, the identical elements and steps are designated by a same numerical reference.

Figure 1:
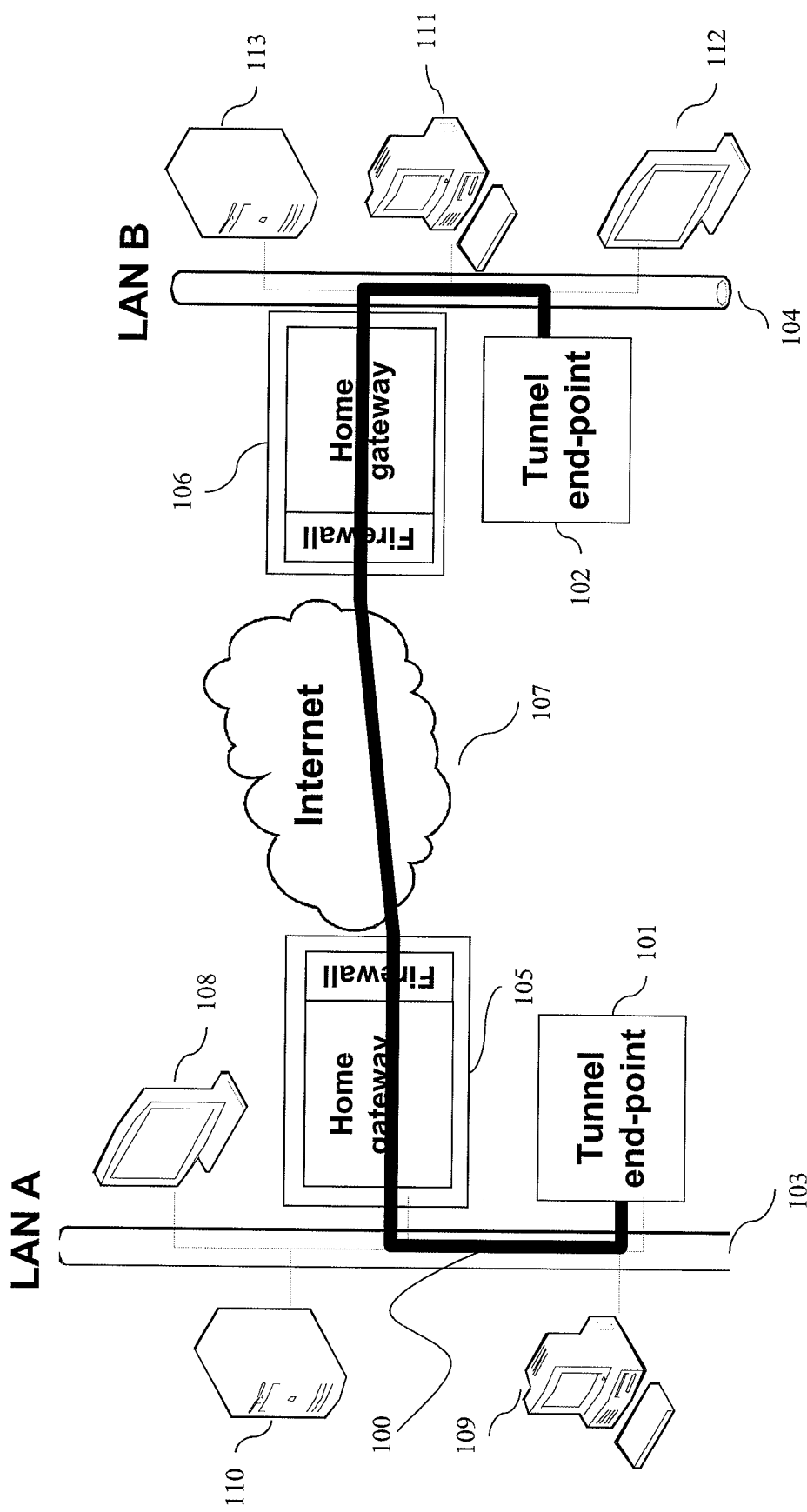
FIG. 1 illustrates a typical configuration of a virtual private network (VPN) implementing a tunnel.

FIG. 1 illustrates a typical configuration of a virtual private network (VPN) implementing a tunnel 100 between a local tunnel end-point 101 and a remote tunnel end-point 102, through a communications network 107 (the Internet for example). This tunnel 100 connects two local networks; LAN A 103 and LAN B 104. Each of the LANs 103 and 104 has a high-bit-rate Internet access apparatus (a home gateway capable of integrating a firewall) 105 and 106, PC type apparatuses 109 and 111, servers 110 and 113 for the storage and distribution of the digital media (of the audio, video and photo type) as well as digital media rendering apparatuses 108 and 112. A tunnel end-point may be integrated into an audiovisual apparatus such as a digital television set. It can also be present in a PC type apparatus in the form of a program performing the functions associated with it.

Once the tunnel 100 is set up, the apparatuses 108, 109, and 110, connected to the LAN A 103, are capable of communicating with the apparatuses 111, 112 and 113, connected to the LAN B 104. For example, the client 108 connected to the LAN A 103 can communicate with the server 113 connected to the network LAN B 104.

This FIG. 1 shows a simple communications network with only one tunnel, but it is understood that a same tunnel end-point may have to manage several tunnels (going to an equivalent number of tunnel end-points) to interconnect a first LAN to several other LANs. Furthermore, for the sake of simplification, the figure does not show the infrastructure apparatuses in the Internet such as the Internet routers.

Figure 2:
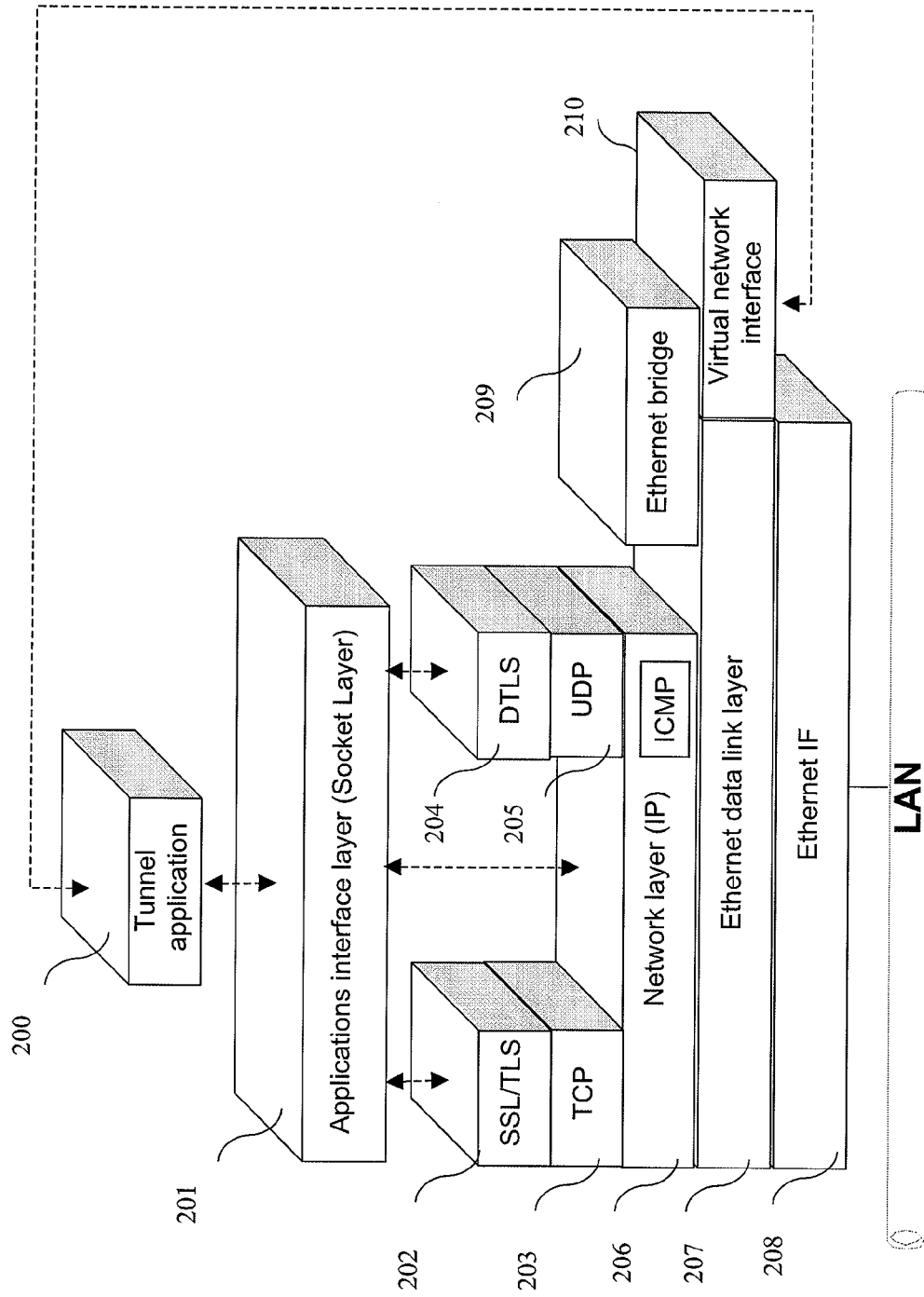
FIG. 2 shows an example of a classic layered model of a tunnel end-point in which the method of the invention can be implemented.

Referring to FIG. 2, we shall now describe the routing of an Ethernet frame that comes from one of the apparatuses 108, 109, 110 (connected to the LAN A 103) and will enter the tunnel 100. To this end, a layered model will be used. This layered model describes the protocol layers needed for the implementation of this tunnel 100. In this model, the protocol elements necessary for functions other than the use of the tunnel are not represented. For example, the protocol elements associated with an UPnP architecture, when a tunnel end-point 101 is integrated into a UPnP apparatus, are not shown.

The tunnel end-point 101 has a Ethernet physical interface 208 which hands over the Ethernet frames coming from the apparatuses 108, 109, 110 to the link layer 207 for routing: this routing is done toward the network layer 206, for the Ethernet frames intended for the apparatus comprising the tunnel end-point or towards the bridge layer 209 for the other Ethernet frames. The bridge layer 209 carries out the classic operations of an Ethernet bridge such as the filtering of Ethernet frames and the relaying of these frames to the appropriate Ethernet output port or ports. The bridge has an Ethernet interface 207 and at least one virtual interface 210, simulating an Ethernet controller, attached to it. A virtual interface 210 is created for each tunnel instantiated by the application 200 to which it gives the Ethernet frames that must travel in transit on the respectively instantiated tunnels. Generally, the protocol for encapsulation of the tunnel represented by the application 200 performs the operations necessary for implementing each tunnel, among them especially the operations of configuration, filtering and encapsulation (formation of a tunnel packet) and extraction of a frame.

The frames received from the virtual interface 210, after processing by the application 200, are handed over in the form of a packet through an applicative interface or socket 201 to a reliable TCP transport protocol 203 or to an non-reliable UDP transport protocol 205, respectively secured by an SSL protocol 202 and a DTLS protocol 204.

The term "reliable transport mode" or "reliable transport protocol" is understood to mean a transport mode or protocol for which a device sending a frame or data packet obtains a piece of information on delivery of the frame or data packet to a receiver device. The main characteristic of such a mode is the assurance of the delivery of the frame or piece of data and not the latency of transfer between the sender device and the receiver device. Here below, the term "reliable channel" will be understood to mean a channel for the transportation of data of a tunnel between two sub-networks (also called local LANs) using a data transport protocol (this data itself can take the form of packets or frames according to a determined transport protocol).

After processing by a transport protocol to form the tunnel packet 250 (FIG. 3), this packet is passed on to the network layer 206. The IP datagram thus formed with the current packet can now be transmitted on the LAN through the link layer 207 and the physical layer 208.

The reception of a frame coming from the tunnel 100 will follow a path in the tunnel end-point that is the reverse of the path presented here above.

Figure 3:
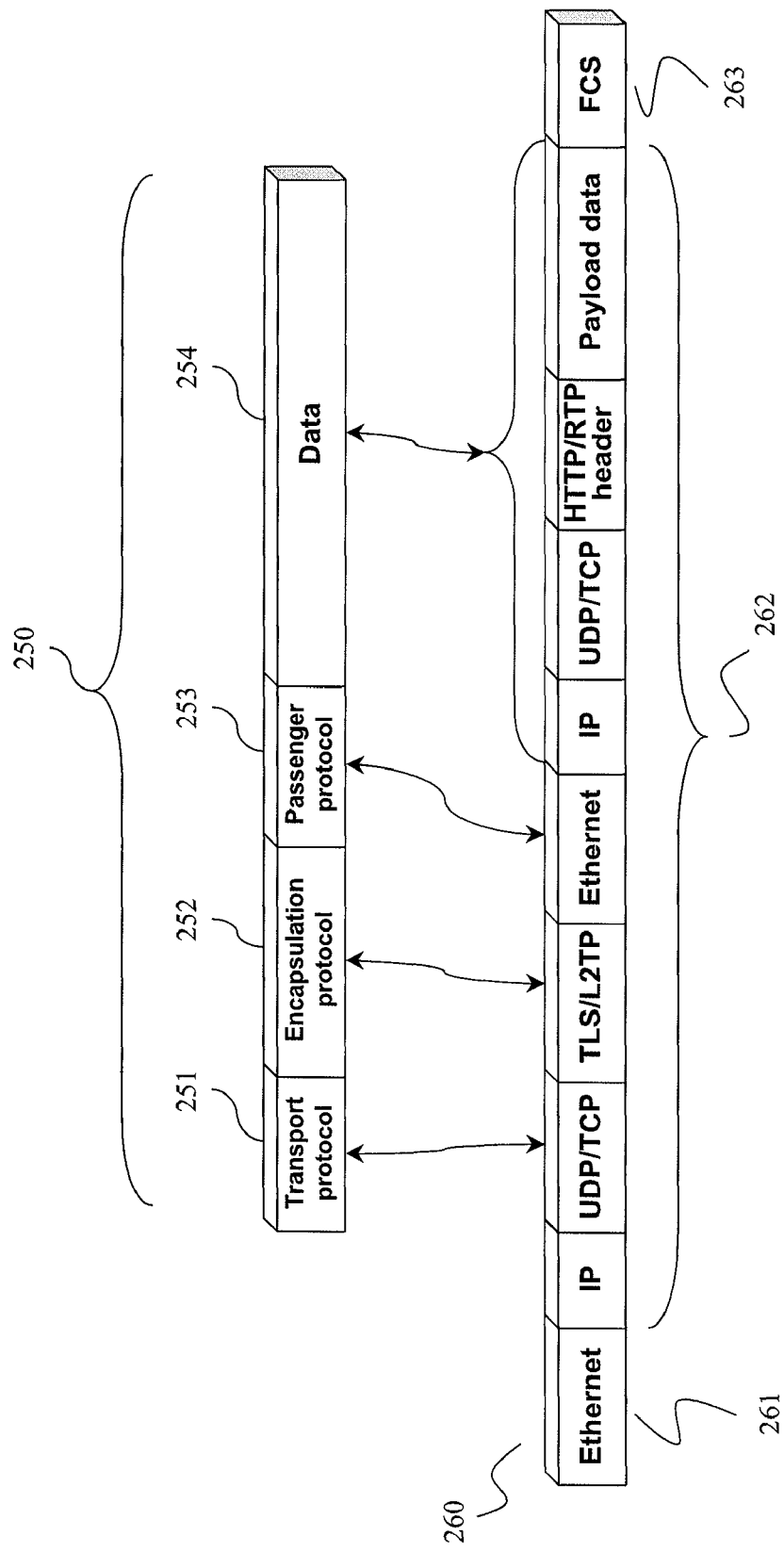
FIG. 3 shows an example of a classic format of an Ethernet frame conveying a level 2 tunnel packet.

FIG. 3 shows an example of a classic format of an Ethernet frame (reference 260) that is in transit for example on the LAN A 103 of FIG. 1 and comprises:
  an Ethernet header field (reference 261),
  a first IP datagram (reference 262) itself transporting a
    level 2 tunnel packet (reference 250), and
  an FCS (Frame Check Sequence) field (reference 263).
  The tunnel packet 250 has four parts:
  a transport protocol header field 251 (i.e. a TCP or UDP
    field in this example),
  a header field of the encapsulation protocol 252 (i.e. L2TP
    or TLS in this example, described especially in the following documents "IETF RFC3931, "Layer two tunneling protocol—version 3 (L2TPv3)", J. Lau and all, March 2005" and "IETF RFC2246, "The TLS Protocol Version 1.0"), a header field of the passenger protocol 253 (namely Ethernet in this example), and finally a user data field 254 which itself comprises a second full IP datagram if no fragmentation has taken place in transit from the source apparatus.

Figure 4:
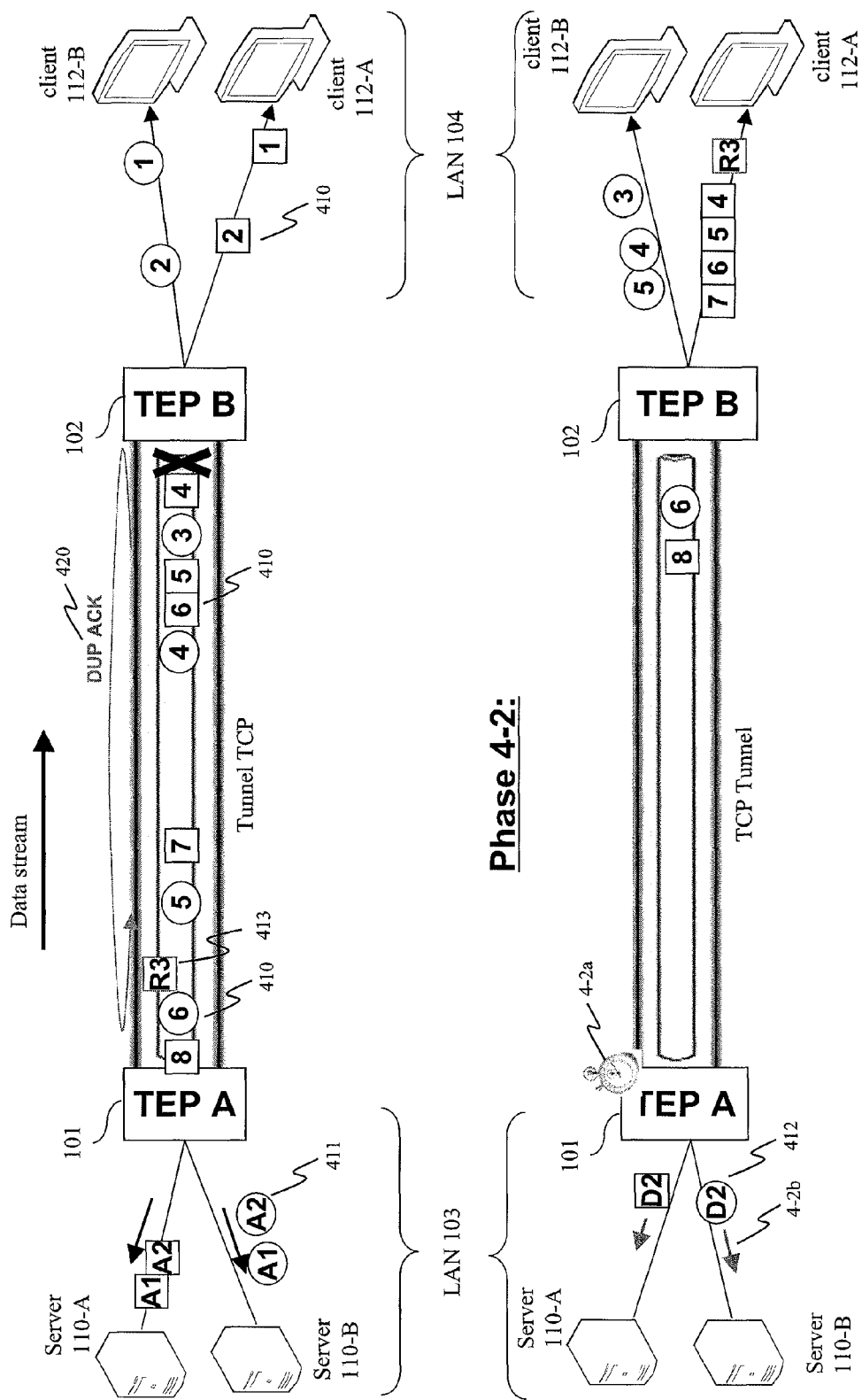
FIG. 4 is a schematic view of a scenario for the application of a particular embodiment of the invention, with reference to the environment described in FIG. 1.

FIG. 4 is a schematic view of a scenario for the application of a particular embodiment of the invention with reference to the environment described in FIG. 1.

The algorithms of this particular embodiment of the invention are described here below according to a positioning on the tunnel end-point 101. In fact, any tunnel end-point is capable of executing the invention. However, a tunnel entry tunnel end-point setting up the algorithms of the invention will focus only on the TCP data received from the local LAN intended for the remote LAN, through the TCP tunnel.

In the cases shown in FIG. 4, the tunnel end-point TEP 101 analyses the TCP data sent from the LAN (local LAN) 103 to enter the tunnel intended for the (remote) LAN 104 as well as the acknowledgments received from the LAN 104 for this TCP data.

In the example, two media servers 110-A and 110-B are positioned in the LAN 103 and two client devices 112-A and 112-B of these servers are positioned in the local area network 104. For the sake of clarity of the explanation of the example it will be noted that the notion of an index of a packet corresponds to the order of sending of sending of the packet (the index i of a packet signifies that the packet is the $i^{th}$ packet) and does not have any reality in the communications protocol (unlike the sequence number which is integrated into each TCP packet).

The following notations will be used for the TCP packets:

packet 410 referenced "i": the data segment TCP indexed i (i.e. the $i^{th}$ packet sent by one of the servers 110-A, 110-B of the LAN 103 for a data sequence number n);

packet 413 noted "Ri": TCP data segment identical to the packet 410 having the same index "i" but which has been re-transmitted with the same data sequence number n;

packet 411 noted "Ai" TCP acknowledgment of a packet "i" or "Ri" for a data sequence number n (hence, according to the TCP protocol, this packet 411 contains an acknowledgment sequence number n+1); this acknowledgment 411 is sent out by a client of the LAN 104 to a server of the LAN 103;

packet 412 noted "Di": TCP acknowledgment of a packet "i" or "Ri" for a data sequence number n (hence, according to the TCP protocol, this packet 411 contains an acknowledgment sequence number n+1); this acknowledgment 412 is sent by the TEP tunnel end-point 101 (according to the mechanism of the present invention, see FIGS. 6 and 8) to a server of the LAN 103. The acknowledgment 412 is a classic acknowledgment (that can be duplicated and then considered as a "Duplicate ACK" by the server) or a selective acknowledgment SACK (these two types of acknowledgment are described in detail in the Appendix).

A classic TCP connection is formed by packets "i" 410 which are acknowledged by packets "Ai" 411.

In the example of FIG. 4, the tunnel therefore sends data packets 410 from the LAN 103 to the LAN 104 and acknowledgment packets 411 from the LAN 104 to the LAN 103 for two distinct TCP connections:

a connection A set up between the server 110-A and the receiver 112-A (the packets of this connections A are represented by squares containing the above-mentioned notations "I", "Ri", "Ai" and "Di");

a connection B, set up between the server 110-B and the receiver 112-B (the packets of this connection B are represented by circles containing the above-mentioned notations "I", "Ri", "Ai" and "Di".

The tunnel end-point TEP 101 is deemed to be capable of preserving the sequence numbers of the packets 410 and 411 in transit on the tunnel (in practice the trace of a segment 410 indexed i is preserved up to reception of the acknowledgment 411 corresponding to it) with a time indication used to know the scheduling and date of transmission on the tunnel. Furthermore, an association of the data sequence numbers is done (specified here below) between the packets of the carrier of the tunnel and the packets of the passenger streams, in order to easily identify the content of each packet of the tunnel carrier (carrier packet).

For information, the tunnel end-point TEP 101 manages a table 501 of the TCP segments sent on the tunnel (this table 501 is described here below with reference to FIG. 5).

Phase 4-1: Detection of Errors on the Tunnel

This phase corresponds to the time of detection of an error on the tunnel. For example, three duplicate acknowledgments (duplicate ACKs) 420 have been sent by the tunnel end-point TEP 102 to indicate the loss of a packet of the tunnel. Automatically, after reception of the three duplicate ACKs for the same data sequence number k (hence according to the TCP protocol with an acknowledgment sequence number k+1), the TCP protocol layer of the tunnel will re-transmit the missing carrier packet. At the same time, an, alarm is triggered on the tunnel end-point TEP 101 in order to determine the nature of the data transported by the carrier packet having the data sequence number k.

In the example of FIG. 4, the carrier packet having the data sequence number k packet corresponds to the packet 410 indexed 3 of the stream 110-A to 112-A (connection A). The tunnel therefore goes into re-transmission to convey this data (packet "R3").

The tunnel end-point TEP 101 then determines those data segments 410 that are blocked in the TCP protocol layer of the remote tunnel end-point 102: it is all the packets 410 of the local area network 103 that have been sent on the tunnel after the packet 410 indexed 3 of the connection A.

In the example, the determined packets 410 are the following:

for the connection A, all the packets having indices greater than 3;

for the connection B, all the packets having indices greater than 2 (the index 2 of the connection B preceded the sending of the packet indexed 3 of the connection A).

The detection of an error in the tunnel is done after the reception of three duplicate ACKs, i.e. after one tunnel round-trip time (RTT) between the tunnel end-point TEP 101 and the tunnel end-point 102. This is why, it can be seen in FIG. 4 that the transmission of the packet 413 indexed R3 on the tunnel (re-transmission of the lost piece of data) coincides approximately with the transmission in reverse to the LAN 103 of the acknowledgments 411 for the non-blocked packets received by remote clients.

This means therefore that future acknowledgments for the following sequences of the connections A and B will be received on the LAN 103 only after one round-trip time between the server and the client (approximated to another round-trip time on the tunnel, since the RTT of the tunnel is far greater than the RTT of each of the LANs 103 and 104).

This is why the next phase 4-2 is aimed at applying a preventive corrective (the generation of acknowledgments 412 by the tunnel end-point TEP 101) to prevent the phenomenon of expiry of the time-out RTO of the servers TCP 111-A and 110-B, and this corrective will be made specific for each server 110-A and 110-B of the LAN 103.

Phase 4-2: Application of a Corrective to the Problem of Expiry of the Time-Out RTO This phase can be sub-divided into two steps 4-2a and 4-2b: one phase (4-2a) is for the computation of a time-out for sending the acknowledgment messages 412 and the other phase (4-2b) generates the sending of the acknowledgment messages 412 at the expiry of this time-out period.

Thus, for each passenger stream of the tunnel, the method determines the date T0 of processing by the tunnel end-point TEP 101 of the first blocked packet 410 (for the stream concerned by the re-transmission on the channel, the first blocked packet is deemed to be the packet 410 in re-transmission).

Following the continuous measurement of the RTT of the tunnel, for each stream, the method determines a date t1 at which a transmission of an acknowledgment message 412 is programmed. This date t1 corresponds to (t0+2*RTT−Δ), where Δ is a 10 safety margin of some milliseconds. It may be recalled that the duration of the period corresponding to the RTO of each server 110-A, 110-B is substantially equal to 2*RTT of the tunnel, and that the preventive corrective of the invention consists in sending each server an acknowledgment message 412 before the expiry of the RTO of each server so as to reset this RTO at zero and hence prevent its expiry.

To this end, an input is recorded in a time-out table 510 (see FIG. 5) comprising the information necessary for the generation of acknowledgment messages 412 to the servers 110-A and 110-B.

If the blockage lasts in the tunnel, it is preferable also to determine one or more second time-out periods to determine one or more dates t2 for sending other acknowledgment messages 412 to the servers TCP 110-A, 110-B concerned. Upon reception of genuine acknowledgments 410 initiated by the clients 112-A, 112-B coming from the remote LAN 104 and conveyed by the tunnel, the subsequent time-out periods are eliminated (there is no subsequent sending of acknowledgment messages 412 generated by the tunnel end-point TEP 101).

Furthermore, the true acknowledgments 411 initiated by the clients 112-A, 112-B, corresponding to the acknowledgments 412 generated, are filtered so as not to send too many acknowledgment messages. Indeed, for example, an accumulation of three duplicate acknowledgments ("duplicate ACKs") would lead the server to conclude by analysis that an error has occurred in the network, and that is to be avoided.

Figure 5:
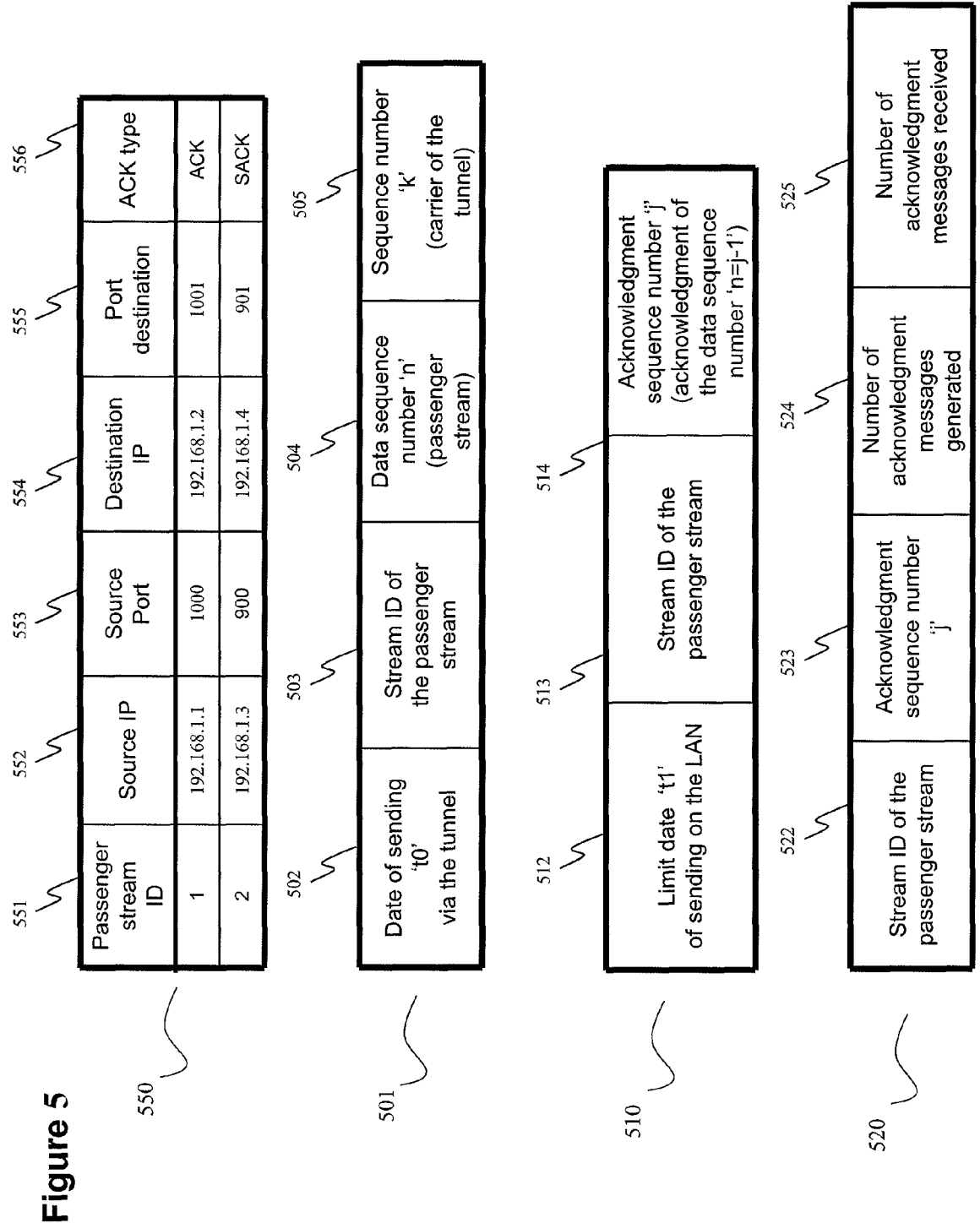
FIG. 5 shows different tables of data structures according to a particular embodiment of the invention.

Referring now to FIG. 5, we present various tables 550, 501, 510 and 520 of data structures. Each data stream is characterized by its source IP address, its source TCP port as well as its destination IP address and its destination TCP port. It must be noted that a same TCP session can convey two data streams because the TCP communication is a two-way communication. Each table here below is described by way of a non-exhaustive example.

The table 550 is the table of the active streams on a tunnel end-point. The term "active stream" is understood here to mean a stream associated with an established TCP session that is not closed. This table 550 includes:
- a field 551 representing, for each stream, a unique identifier assigned to this stream and acting as a reference for the other data structures relative to a stream;
- fields 552 and 554 respectively representing the source and destination IP addresses of the TCP session;
- fields 553 and 555 respectively representing the source and destination ports of the TCP session;
- field 556 corresponding to the type of acknowledgment message supported by the connection. For example, a classic type acknowledgment (ACK) or selective type acknowledgment (SACK).

The table 501 represents the pieces of data pertaining to the TCP packets 410 for each active stream of the table 550 that are transferred on the tunnel. There is one input in the table for each TCP packet of a passenger stream transferred on the tunnel and not yet acknowledged. This table 501 comprises:
- a field 502 representing a date t0 of processing of the TCP segment/packet by the tunnel end-point 101 such as for example the date on which the TCP segment/packet is sent in the tunnel (approximately, overlooking the time needed to encapsulate the packet 410, this value can be identified with the date of reception of the packet 410 by the tunnel end-point, coming from the local LAN);
- a field 503 representing the stream identifier 551;
- a field 504 representing a data sequence number n of a passenger stream packet, i.e. a TCP data sequence number (TCP packet 410, i.e. a passenger segment) received by the tunnel end-point 101 coming from the LAN for the stream 551 concerned;
- a field representing a data sequence number k of a carrier packet of the carrier of the tunnel, i.e. a TCP data sequence number of the carrier of the packet (carrier packet) which conveys the passenger segment (TCP packet 410) indicated at 504.

The table 510 represents a time-out value storage table for the subsequent generation of acknowledgment messages 412. There is an input in the table for each programmed transmission. This table 510 comprises:
- a field 512 representing the date of expiry (t1 for example) at which an acknowledgment message 412 must be generated;
- a field 513 representing the stream identifier 551;
- a field 514 representing an acknowledgment sequence number "j" which acknowledges the data sequence number "n" (n=j−1) recorded in the table 501 (field 504) for a same stream identifier (fields 503 (table 501) and 551 (table 550)). Hence, according to the TCP protocol, the field 514 contains the acknowledgment sequence number "j" (which indicates that the data sequence number "j−1" has been truly received and that the data sequence number "j" is awaited).

The table 520 is a table for counting acknowledgment messages 412 generated for each stream. This table 520 comprises:
- a field 522 representing the stream identifier 513;
- a field 523 representing the acknowledgment sequence number 514. In practice, the table 520 keeps only one entry per stream 513 corresponding to the last acknowledgment 412 generated (the acknowledgments 412 preliminarily generated for the prior segments no longer have any importance because they acknowledge smaller data sequence numbers and the present last acknowledgment generated intrinsically acknowledges all the prior segments according to the scheduled acknowledgment protocol of the TCP protocol);

a field 524 representing the number of acknowledgment messages 412 generated by the tunnel end-point for the above-mentioned acknowledgment sequence number 523 of the concerned stream 522;

a field 525 representing the number of acknowledgment messages 411 received by the tunnel end-point through the tunnel and coming from the remote client 112-A or 112-B, for the above-mentioned acknowledgment sequence number 523 of the concerned stream 522.

FIG. 6 shows an algorithm executed upon detection of a transmission error of the tunnel, this algorithm being included in a particular embodiment of the corrective method of the invention, implemented on the tunnel end-point TEP (101 for example).

The tunnel end-point TEP 101 supervises the data stream of the active connections which travel through the tunnel.

Preferably, the description is situated in the context of a tunnel end-point TEP which manages the routing of the passenger TCP streams on the tunnel 100, i.e. the tunnel end-point TEP 101 is able to identify the TCP streams on its input port which will travel in the tunnel. For example, we can reasonably consider two types of TCP streams: those corresponding to major (and especially lasting) transfers and the control streams (a few round-trip messages). Thus, only the first category of TCP stream is considered by a particular embodiment of the invention: this enables the allocation of a bandwidth for streams that can benefit from it. Such streams are detectable for example by reception by the tunnel end-point TEP of quality of service QoS queries such as UPnP, QoS or SBM queries, or queries related to any other QoS protocol active on one of the LANs. Priority queries relative to streams make it possible to know the nature of these streams: in the IEEE802.1Q standard, priorities 4 to 6 respectively correspond to streaming, video transfers and audio transfers. These QoS queries carry all the references subsequently needed for an identification of the TCP stream (source and destination addresses, ports, protocol). It is clear that, in the example proposed, only the TCP transfer protocol streams are considered.

Furthermore, at the detection of the opening a TCP connection (TCP packet with SYN flag, see Appendix), a deeper analysis of the applicative protocols provides knowledge of the transfer characteristics: for example, a TCP stream carrying an http applicative protocol (253) contains information representing the type of media requested (http GET message for a video with a MIME type "video/mpeg"). These examples are given as non-exhaustive examples.

In one particular embodiment of the invention, it is deemed to be the case that any other TCP stream that is not identified as specified here above is conveyed in the tunnel without any management control by the tunnel end-point TEP 101. This has the advantage of keeping the available processor and memory resources of the tunnel end-point TEP 101 for very important streams. It is clear that in one variant the method of the invention is applicable to all the TCP streams that travel through the tunnel.

In another particular embodiment, the type of acknowledgment used by each TCP connection is also determined. The SACK extension (compliant with the document RFC2018) uses two optional fields in the TCP messages. The first field is a "SACK-permitted" activation option, which is validated or not validated in the TCP SYN segment when the connection is started up, indicating the possibility of a subsequent use of the SACK mechanism. The second option is the SACK option which is validated during transmission for a selective acknowledgment if authorized when the TCP connection is set up.

The table of the streams 550 (see FIG. 5) is updated regularly at each opening/closing of a new TCP connection. Furthermore, the table 501 (see FIG. 5) manages the data segments and acknowledgments received for example by the TCP client-server pair (110-A and 112-A) in the context of the environment described with reference to FIG. 1.

The present invention is not aimed at claiming the manner of filling the table 550. There are several prior-art techniques for this purpose.

For the streams considered, the tunnel end-point TEP 101 keeps (table 501) the TCP sequence numbers of the data segments (packets) of data (DATA) that go through the tunnel end-point TEP 101. This means that at any time, the tunnel end-point TEP 101 knows the number (flightsize) of packets sent in the tunnel and not acknowledged.

Furthermore, a tunnel end-point obtains the characteristics of the network connector or socket open for the TCP channel of the tunnel (for example by using the API "Unix Socket Interface" enabling it to know the errors in the tunnel. API signifies "Application Programming Interface".

Preferably, a modified TCP protocol stack is used by the tunnel end-point TEP 101 in order to fill the table 501. Either the protocol stack updates the table 501 directly during the reception, through the routing function of the tunnel end-point TEP 101, of a command for sending data of the passenger streams on the tunnel, or an additional piece of information on the TCP data sequence number of the tunnel is indicated in return for the command for sending data through the API "Unix Socket Interface" and it is the tunnel end-point TEP itself that updates the table 501.

When an error is detected in the tunnel, the API "Unix Socket Interface" is capable of alerting the algorithms of the invention and especially of reviving the steps 600 of FIG. 6. It will be noted that the tunnel TCP itself manages the re-transmission of the lost packets.

The step 601 consists of the determining, from the table 501 and from knowledge of the data sequence number of the lost packet of the TCP carrier of the tunnel (identifier 505), of the passenger stream concerned (identifier 503) and the data sequence number of the packet conveyed 410 (number 504) which was transported by the lost packet of the TCP carrier.

At the step 602, again on the basis of the table 501, for each other stream conveyed on the tunnel, the invention determines the first data sequence number sent after the packet 410 determined at the step 601. These are data sequence numbers to which the principle of generation of messages of the invention towards their relative TCP servers will be applied.

At the step 603, selective scheduling may be made of the passenger TCP streams among those eligible as specified here above, and only the selected streams are considered, one by one, for the execution of the step 604 and 605. If not, all the previously determined streams are considered one by one for the execution of the step 604 and 605.

Several options are possible for the scheduling:
- the TCP streams in slow start phase (see Appendix) are considered to have priority owing to the more substantial increase of their congestion window in this phase, for which the limit (SSTHRESH) is not known a priori;
- preferably, the invention avoids a TCP stream undergoing low window sizing in stabilized phase (this is the congestion avoidance phase, see Appendix). A downsizing of the window will have but little effect;
- the value of the equipment window (or advertised window, see Appendix) sent by a client can be used to know the streams proposing the widest margin for the increase of the bit rate;

the streams considered as having priority are those that have sent data in a time span that is very close to the passenger stream determined at 601 (i.e. having undergone re-transmission on the tunnel). It will be noted that the stream determined at 601 is the first to which the corrective algorithms of the invention will be applied.

The step 604 is used to determine the first date of sending t1 (first time-out) an acknowledgment message 412 generated according to the invention, towards the TCP server.

In the step 605, the sending of the acknowledgment message 412 is programmed in the table of programmed dispatches 510.

We may note the particular aspect of the determining of the first transmission date t1. The second transmission date t2 (second time-out) can possibly be programmed subsequently, as described in detail with reference to the step 807 of FIG. 8).

The first transmission date t1 of an acknowledgment message 412, for each passenger stream of the tunnel to which the steps 604 and 605 are applied, greatly depends on the value of the continuous measurement of the RTT of the tunnel (parameter common to all the passenger streams) as well as the date t0 of the processing by the tunnel end-point 101 of the first blocked packet of the passenger stream considered (with one date t0 particular to each stream). Thus, the activation of a first time-out is made specific for each stream and is coordinated with the activity of the stream so as to be the least intrusive possible.

It can be recalled that the first transmission date t1, programmed for the generation of an acknowledgment message 412 (activation of the algorithm of FIG. 8) is obtained as follows: t1=t0+2*RTT−Δ, where Δ is a safety margin of some milliseconds (for example 10% of the tunnel RTT).

FIG. 7 shows an algorithm executed upon reception of an acknowledgment coming from the tunnel for the passenger TCP stream of this tunnel, this algorithm being included in a particular embodiment of the corrective method of the invention, implemented in a tunnel end-point TEP (101) for example.

At the step 700, the tunnel end-point TEP 101 is alerted to the reception of a TCP acknowledgment message from a passenger connection (for example with respect to FIG. 4, an acknowledgment 411 coming from the client 112-A following the dispatch of a segment 410 by the server 110-A).

In the step 701, after reception of an acknowledgment 411 coming from the client 112-A, corresponding to one or more segment data sequence numbers (packets) 410 sent through the tunnel, an analysis is made of this acknowledgment 411. This acknowledgment 411 can also be a classic acknowledgment (compliant with the document RFC793) or of the SACK type (compliant with a document RFC2018). In both cases, for the stream concerned, inputs are determined in the table 501 whose data sequence number 504 has a value smaller than or equal to the acknowledgment sequence number indicated in the acknowledgment 411. Then, all the entries thus determined are eliminated from the table 501. Even if the acknowledgment 411 is of a SACK type and indicates that a transmission error has taken place for certain sequence numbers, the acknowledgment sequence number reported by the SACK type message is considered: this means that all the packets 410 up to this (maximum) acknowledgment sequence number have been transmitted by the tunnel end-point TEP 102 on the local network, but apparently with losses.

In the step 702, a search is made in the table 510 which indicates whether the corrective procedure of the invention has been followed (i.e. whether the step 605 of FIG. 6 has been performed) for the stream concerned. This is the case in the event of the determining of an entry of this table having a field 513 corresponding to the identifier of the current connection conveying the acknowledgment 411.

If the test 702 is negative, the operation passes directly to the step 705. If the test 702 is positive, the search is refined in the step 703 in verifying that the acknowledgment sequence number of the acknowledgment 411 has a ratio with the corrective measure applied. If there is an entry of the table 510 that also meets the field criterion 514 corresponding to the sequence acknowledged by the acknowledgment 411, then the step 704 is executed. Should the SACK option be taken, the field 514 must be included equally well in the list of the SACK message of the acknowledged sequences of the acknowledgment 411 (a positive acknowledgment corresponds to the classic case in which the SACK option is not used) or in the list (of the SACK message) of the erroneous sequences (in this case a segment has been lost and then the server must be informed).

The step 704 consists in erasing the entry programmed in the list 510 of time-outs in order to stop the corrective measurement following the detection of loss on the tunnel. Then, the operation passes to the step 705.

The test of the step 705 is used to find out if a corrective measure has taken in the past on the current passenger stream so as not to destabilize this TCP connection following the generation of the acknowledgment messages 412 (see FIG. 8 for the generation). A search is made to see if the stream is identified in the table 520 for counting acknowledgment messages 412 generated by the invention.

If the test 705 is negative, no filtering is performed on the acknowledgment 411 which will be sent normally on the LAN 103 (step 708).

If the test 705 is positive, the test of the step 706 is performed to find out if the acknowledgment 411 acknowledges a segment for which acknowledgments 412 have been generated on the LAN 103.

If the result of the test 706 is negative, then a check is made (the test of step 707) to find out if the acknowledgment message 411 acknowledges a data sequence number greater than the data sequence number acknowledged by the acknowledgment sequence number recorded in the table 520. In other words, a check is made to see if the acknowledgment 411 acknowledges several data segments 410 including the one considered in the table 520. If the result of the test 707 is positive, the current input in the table 520 is eliminated (step 711), and the acknowledgment 411 will be sent normally on the LAN 103 (step 708). If the step 707 is negative, the operation passes directly to the step 708.

If the result of the test 706 is positive, the current acknowledgment 411 corresponds exactly to an acknowledgment 412 generated by the invention (see FIG. 8). The statistics of reception of an acknowledgment 411 are updated (field 525 incremented at the step 709) and a check is made to find out if the current acknowledgment 411 can be relayed without problem on the LAN 103 (the test of the step 710).

Thus, so long as it has not received more acknowledgments 411 than have been generated 412 (the test 710 is negative), the acknowledgments 411 are destroyed (with the filtering of the step 712). If there are more acknowledgments 411 received (the result of the test 710 is positive), it means that the invention has restored the balance in the number of acknowledgments that the TCP server 110 will receive and that the measure, of elimination of the secondary effects induced by the generation of "fictitious" acknowledgments 412 can be taken: the invention passes to the step 711 already described here above.

Preferably (this is not shown in FIG. 7), should the acknowledgment 411 be a SACK type acknowledgment, the invention proceeds iteratively to the remaining steps 705 to 708 described here above for each of the data sequences referenced in the acknowledgment 411 (the acknowledgment is positive or not positive).

FIG. 8 presents an algorithm executed upon the expiry of a time-out indicating a first date t1 (see step 604 and 605 of FIG. 6) for the generation and sending of an acknowledgment message 412 to a local TCP server, this algorithm being included in a particular embodiment of the corrective method of the invention, implemented on a tunnel end-point TEP (101 for example).

At the step 801, the entries of the programming table 510 necessitating an acknowledgment 412 generation action are determined.

For each determined entry (the test of the step 802) the sequence of steps 803 to 809 is performed.

At the step 803, the parameters needed for creating the acknowledgment message 412 are retrieved from the different tables:
- the table 510 indicates the stream concerned (field 513) and the acknowledgment sequence number (field 514) for which an acknowledgment 412 has to be generated;
- starting from the identifier of the stream 513 and with the table 550, the fields 552 to 555 enable the forming of the IP header of the message, and the field 556 indicates the type of acknowledgment supported. By default, the classic type according to the standard RFC793 may be constantly used but it is recommended that the use of the SACK support be preferred when it is supported by the server.

The step 804 creates the acknowledgment message 412 (according to the prior art) and sends it on the local network 103.

The current entry can then be eliminated from the table 510 (step 805) and the acknowledgment message generation statistics 412 are incremented in the table 520 (step 806). If need be, a new entry is created in the table 510 with a field 524 at 1 and a field 525 at 0.

As a precautionary measure, it is important to try to subsequently create a new generation of acknowledgment messages 412. Indeed, the present generation at the step 804 overcomes a simple loss in the tunnel but it is desirable to envisage a case in which the tunnel takes more than one RTT to be restored. Thus, the test of the step 807 verifies the possibility of a new generation of an acknowledgment message 412 and the step 808 then computes the date t2 recommended for the sending on the LAN 103 of the new acknowledgment message 412.

First of all, a check is made to see whether a message can be generated by the following two conditions combined:

Condition 1: N must be greater than or equal to 1 with $N=Nb\_packet\_410-Nb\_packet\_412$; where:

"Nb_packet_410" is the number of packets 410 (data sequence number greater than the data sequence number acknowledged by the acknowledgment sequence number of the field 523 of the current entry of the table 520) in transit on the tunnel, hence referenced in the table 501; and "Nb_packet_412" is the number of acknowledgment packets 412 generated (value of the field 524 of the current entry of the table 520).

In other words, the condition 1 can also be expressed as follows:

$Nb\_packet\_410 > Nb\_packet\_412$.

Condition 2: "Nb_packet_412" must be smaller than or equal to 3.

Indeed, if more than three identical acknowledgment messages 412 were to be generated, then the fourth of these identical acknowledgment messages would be considered to be the third duplicate acknowledgment message ("duplicate ACK") and the server would interpret this as being a transmission error (which is to be avoided).

If the above-mentioned two conditions are not verified, the procedure is completed for the current entry (return to the step 802).

If the above-mentioned two conditions are verified, the step 808 is implemented. The new date t2 to be programmed for the generation of acknowledgment messages 412 is obtained as follows:

$$t2 = \text{current\_date} + 2*RTT - \Delta$$

where $\Delta$ is a safety margin of some milliseconds (for example 10% of the tunnel RTT) and "current_date" is the previous acknowledgment generation date 412 (i.e. M.

Once the sending date t2 has been determined, the new sending operation is programmed at the step 809.

Like the first sending date t1, the second date t2 for sending an acknowledgment message 412, for each passenger stream of the tunnel to which the steps 808 and 809 are applied, depends heavily on the value of the continuous measurement of the RTT of the tunnel (a parameter common to all the passenger streams) as well as the date t1 (particular to each stream). Thus, the activation of a second time-out (determining t2) is made particular for each stream and is co-ordinated with the activity of this stream in order to be as non-intrusive as possible.

It is clear that any stopping of transmission (TCP SYN-END message detected, see Appendix) for the TCP connection between a server 110-A, 110-B and a client 112-A, 112-B for a stream selected by the algorithms of the invention automatically stops the setting up of the algorithm of FIG. 8. To this end, (not shown in the drawings), as soon as a TCP connection is stopped, the tables 550, 501, 510 and 520 are rid of the entries referencing the closed TCP connection.

FIG. 9 provides a schematic view of a functional architecture of a PEP system of a tunnel endpoint 101 implementing the algorithms of the invention.

The tunnel endpoint TEP 101 is formed chiefly by two communications ports with the LAN 103: an input 910 and output port 920. In practice, these two ports have a same Ethernet type two-way physical interface (network port 1020 according to FIG. 10).

These two ports are connected to the TCP channel 930 of the tunnel connecting the two LANs 103 and 104 and communicating through a multiplexer 931 having the task of encapsulating the passenger streams in the tunnel frames and a de-multiplexer 932 having the task of de-encapsulating the frames conveyed by the TCP carrier of the tunnel.

At the arrival of the Ethernet frames from the LAN 103, the stream selector TCP 911 is in charge of applying the selection measures described in detail with reference to the steps 600 of FIG. 6.

If the entry frame pertains to a non-selected TCP stream, this Ethernet frame is provided to the multiplexer 931 in order to be encapsulated and sent in the tunnel.

If the entry frame pertains to a selected TCP stream, the agent 912 analyses the type of TCP segment conveyed (DATA or ACK) and updates the statistics of the tables 550 and 501.

Upon a transmission error alert from the controller 940 of the tunnel, the PEP system 913 for the generation of acknowledgement messages 412 implements the algorithm described in FIG. 6. A setting of the time-out mechanism (table 510)

internal to this PEP system 913 will revive the procedure of the algorithm of FIG. 8 at the appropriate moment.

Conversely, at the reception of a frame from the tunnel, the de-multiplexer 932 gives the original Ethernet frame to the stream switch 933. The stream switch 933 is then responsible for checking to see if the frame relates to a TCP connection. If the check is positive, it is responsible for checking to see whether this TCP connection is monitored (search for criteria identical to the TCP stream selector 911). If this is not the case, the Ethernet frame is transmitted on the local area network 103 through the output interface module 936.

Otherwise, it is transmitted to the module 934 in charge of updating the statistics of the connection (step 701 of the algorithm of FIG. 7). The module 935 then performs the algorithm of FIG. 7, especially with the capacity for filtering (eliminating) the messages 411. Any Ethernet frame that does not correspond to an acknowledgement message 411 for which an acknowledgement message 412 has already been transmitted will be sent on the LAN 103 through the output interface module 936. The module 935 also informs the PEP system 913 about the activation/deactivation of the time-out mechanism for the acknowledgement message 411 received (as described with reference to FIG. 7).

FIG. 10 illustrates a schematic configuration of a generic communications device 1000 adapted to implementing a particular embodiment of the technique of the invention. For example, the tunnel end-point 101 or 102 mentioned here above with reference to FIG. 1 is identical to the generic device 1000.

This generic device 1000 may be connected in particular to any means for the storage of images, videos or sound connected to a graphic card and delivering multimedia information to the generic device 1000.

The generic device 1000 has a communications bus 1002 to which the following are connected:
- a central processing unit 1003 (for example a microprocessor referenced CPU);
- a read-only memory 1004 referenced ROM capable of comprising the above-mentioned software program or programs;
- a random-access memory 1006 (cache memory referenced RAM) comprising registers suited to recording variables and parameters created and modified in the course of execution by the above-mentioned software program or programs;
- a communications interface 1018 linked to at least two distributed communications networks 1020, for example (in the case of FIG. 1) the LAN 103/104 and the Internet 107, the interface being capable of transmitting and receiving data with these networks.

The generic device 1000 also has (but this is optional):
- a screen 1008 used to view the data and/or serve as a graphic user interface with the network administrator who could interact with the program or programs according to the invention using a keyboard 1010 or any other means such as a pointing device, for example a mouse 1011 or an optical pencil;
- a hard disk drive 1012 capable of comprising the above-mentioned programs;
- an external disk drive 1014 enabling the reading of a USB memory stick.

The communications bus 1002 enables communications and interoperability between the different means included in the generic device 1000 or connected to this device. More generally, through the communications bus 1002, the central processing unit 1003 can communicate instructions to any device included in the generic device 1000 directly or by means of another generic device.

The executable code of each program mentioned here above enabling the generic device 1000 to implement the method according to one embodiment of the invention (the method for the management of PEP mechanisms) can be stored in a non-volatile memory, for example the hard disk drive 1012, the read-only memory 1004 or the USB stick 1016.

The central processing unit 1003 controls and directs the execution of the instructions or portions of software code of the program or programs according to one embodiment of the invention (the method for the management of PEP mechanisms). When the equipment is powered on, the program or programs which are stored in the above-mentioned non-volatile memory (1012, 1004 or 1016) are transferred to the random-access memory 1006, which will then contain the executable code of the program or programs of the invention, as well as registers to memorize the variables and parameters needed to implement this embodiment of the method of the invention.

It must be noted that the communications apparatus comprising the device according to the invention can also be a programmed apparatus. This apparatus then contains the code of the computer program or programs, for example hard-wired into an applications specific integrated circuit (ASIC).

APPENDIX

Reminders Concerning the TCP Protocol

The TCP protocol (Transmission Control Protocol as defined by the RFC 793 standard) is an ARQ type protocol created in order to provide data transfer on the Internet according to a major criteria of speed and quality. At least two mechanisms are used to manage excess traffic arriving at a receiver: the first uses buffer reception memories and the second sets up a control of streams.

The TCP protocol is used to transfer data reliably although it uses the IP protocol which incorporates no control of datagram delivery. Indeed, the TCP protocol has a reception acknowledgment system also called an acknowledge system or ACK used by the client (also called client device or receiver machine) and the server (also called server device or sender machine) to be sure of the efficient mutual reception of data. When a data segment (also called a data packet) is sent, an order number (also called a data sequence number) is associated therewith. Upon reception of a data segment, the receiver machine will return a data segment whose flag ACK is at 1 (in order to report that this is an acknowledgment of reception) accompanied by an acknowledgment of reception number (also called an acknowledgment sequence number) equal to the data sequence number of the segment received incremented by 1. Indeed, the acknowledgment sequence number corresponds to the data sequence number of the next segment awaited (and not the data sequence number of the last segment received).

Since the communications process, which is carried out by means of a data transmission and an acknowledgment of reception, is based on a data order number (or sequence number) the sender and receiver (respectively server and client) machines must know the initial order number of the other machine (called initial sequence number or ISN).

Setting Up a Connection

A TCP connection is set up in three stages:

in a first stage, the client sends a data segment comprising the SYN flag (or SYN message) to report that this is a synchronization segment with its initial data sequence number (ISN=x);

in a second stage, the server receives the synchronization segment coming from the client, and then sends it an acknowledgment of reception, i.e. a data segment whose flag ACK is at 1 and whose flag SYN is at 1 comprising its own sequence number (ISN=y), but it must also acknowledge the previous packet, which it does with an acknowledgment of reception number (acknowledgment sequence number) that contains the initial order number of the client incremented by 1 (ack=x+1);

in a third stage, the client sends the server an acknowledgment of reception, i.e. a segment whose flag ACK is at 1 and whose flag SYN is at 0 because it is no longer a synchronization segment. Its order number (data sequence number) is incremented (seq=x+1) and the acknowledgment reception number (acknowledgment sequence number) represents the initial order number (data sequence number) of the server incremented by 1 (ack=y+1).

Once this phase called a "three-way handshake" is completed, the two applications are capable of exchanging the bytes that warrant the setting up of the connection.

The stream control manages the allocation of resources, such as the memory and the process. at the level of the intended recipient. In general, in compliance with stream control, the destination sets a limit on the transmission throughput rate implemented by all the sources that send data to the destination. The sources and the destinations coordinate the transfer of data through an exchange of messages comprising queries and acknowledgments of reception. Before the source starts sending packets, it sends a request to the destination aimed at obtaining permission to start transmission. In response to this query, the destination sends a message comprising an identification of the number of packets that the source can transmit to the destination without additional authorization. This number is commonly called "window size". Then, the source sends the number of authorized packets to the destination and waits for the destination to verify their reception. After the destination has successfully received a packet, it sends a return message to the source comprising an acknowledgment of reception (acknowledgment) indicating that the packet has been received successfully and in certain cases permitting the source to send another packet. Thus, the number of packets on the network traveling from the source to the destination never exceeds the authorized window size.

Here below, different names for the TCP windows shall be noted:

TCP window: the initial value validated during the setting up of the connection, which is a maximum value permitted throughout the duration of the connection;

congestion window (CWND): the value of the current window sent from the server in a TCP packet addressed to the client;

acknowledgment window (acknowledge-window or advertised-window): the value of the window sent in an ACK TCP packet to the server which indicates the memory occupation on the part of the client;

sliding window: the value of a window internal to a server enabling it to know the number of pieces of data to be transmitted since the arrival of the last acknowledgment TCP segment.

A large TCP window size encourages sending. If the number of pieces of data received is greater than what the window indicates, the out-of-window data are rejected. This loss leads to a large number of retransmissions and unnecessarily overburdens the network and the TCPs. The use of a small size of window breaks up the throughput rate by adding a certain additional delay to the round-trip time or RTT but does so in limiting the excess load of the network due to retransmission. The opening of a very small window also reduces performance by increasing the weight of the headers relative to the data.

Even with the setting up of these mechanisms, in a busy network, several sources simultaneously send streams in the network to more than one destination. If too many such streams converge on a single router in a very short period of time, then the limited capacity in buffer memory of this router makes this volume of stream incapable of being processed, and this router will reject or destroy a part of the packets. When such a situation occurs, the network is said to be congested. When such a situation occurs, the transfers in the network get slowed down considerably and the throughput rate of the network drops. Since certain resources of the network are dedicated to the retransmission, when the network undergoes an overload, there is a substantial risk of occurrences of propagation of congestions and of the blocking of the entire network.

The value of the TCP MSS (Maximum Segment Size) field indicates the maximum quantity of TCP data per IP datagram that the local system can accept. When sent, the IP datagram can be broken up into several packets. In theory, this value can reach the value 65495. However such a great value is never implemented. Typically, a terminal system uses the MTU interface (outgoing interface Maximum Transfer Unit) from which the value 40 is deducted as its TCP MSS field value. For example, a TCP MSS field value for the Ethernet protocol is 1460 (1500−40=1460).

The value of the TCP MSS field is entered into the packets which are used to set up the connection which are the packets containing the signal SYN. Each side sends its own TCP MSS field value. It is not required that each side should use the same TCP MSS field value but each side cannot send more data than that authorized by the remote station. The value of the TCP MSS field is sent at the maximum segment size (MSS) of the TCP header option.

It will be noted that the default value of the size of the buffer memory of the connection interface differs greatly as a function of implementation. The old implementations derived from Berkeley dictate default values of 4 Kb for the TCP reception and sending buffer memories, while the more recent system implements greater values (for example up to 64 Kb). For example, in Windows XP (registered mark), the current value of the window size at reception gets adjusted automatically according to pair increments of the maximum segment size (MSS) negotiated when the TCP connection is set up.

Control of the Stream

The TCP protocol uses several algorithms to manage its congestion, more particularly a slow start and a congestion avoidance algorithm. Each of these algorithms manages the sending throughput rate of the server by manipulating a congestion window (CWND) which restricts the number of unacknowledged bytes in transit at a given point in time. The possible TCP throughput rate for a given congestion window value is determined by the speed at which acknowledgments are received. The time taken to receive an acknowledgment after the sending of a piece of data is called TCP round-trip time (RTT).

When a connection is started up, the slow start algorithm is set up to rapidly increase the congestion window (CWND) in order to attain the value of the bandwidth as quickly as possible. The variable SSTHRESH (steady-state threshold) is maintained by the server in order to distinguish the two phases. When the sender concludes that there is a loss of a segment, it processes this information as an implicit signal of a network overload and rapidly decreases the congestion window. After having deduced the congestion threshold SSTHRESH approximately, TCP sets up the congestion avoidance algorithm which increases the value of the congestion window more slowly in order to occupy the additional bandwidth available.

During the slow start phase (when starting the connection or after the time-out has been exceeded), the starter starts with a CWND window setting operation of 1 MSS, and CWND increases by 1*MSS after each reception of a acknowledgment. The congestion window CWND is approximately doubled at each RTT (exponential growth). During the congestion avoidance phase (congestion-avoidance) the increase in CWND is limited to 1*MSS by RTT (additive growth).

A drop in performance is noted in the Internet where there is a long propagation time. This prevents the transmission window from sending new segments rapidly (the acknowledgments determine the increase in the size of the transmission window and they arrive after a long period of time).

Detection of Congestion and Duplicate Acknowledgments (Duplicate ACKs)

For a TCP connection, if the server apparatus receives several ACKs with an identical acknowledgment sequence number, the term used is "duplicate acknowledgments" (or duplicate ACKs). The server then re-transmits the data segment corresponding to the specified data sequence number. Even if the server receives no duplicate ACK, in the case it receives no other ACKs (with another acknowledgment sequence number) during a determined period of time after sending a data segment, the server re-transmits this non-acknowledged data segment.

Typically, the TCP client sends out a duplicate acknowledgement or duplicate ACK upon the reception, out of order, of a data segment (i.e. when it receives a data segment with a data sequence number greater than the expected data sequence number). The purpose of the duplicate ACK is to inform the server that a data segment has been received out of order and to tell it the data sequence number that had been expected. A burst of duplicate ACKs is the result of lost data segments and/or a re-scheduling of data segments on the transmission path.

Fast Re-Transmit and Fast Recovery Algorithms

The TCP protocol uses a fast re-transmit algorithm (mechanism) described in the IETF RFC2581 Internet standard for fast detection and reaction to packet losses identified by the reception of duplicate ACKs. The fast re-transmit algorithm considers the arrival of three duplicate ACKs (in fact four identical acknowledgements or ACKs without any other acknowledgement indicating that the supposed problem has been brought back to normal) as an indication that a data segment has been lost. If fewer than three duplicate ACKs are received, it is deemed to be the case that it was a brief problem of de-scheduling of packets which has been resolved and followed by the acknowledgement for the segment concerned. Upon reception of these three duplicate ACKs the server will re-transmit the missing data segment without waiting for an expiry of its RTO or re-transmission timeout.

Then, a fast recovery algorithm is started to manage the transmission of the new data up to the reception of a non-duplicate ACK. Since the TCP client can send a duplicate ACK only upon the arrival of another data segment, it means that one data segment (but not the one expected) has nevertheless been received and is no longer using any resources in the network. There is therefore always some activity on the network and the TCP server can continue to transmit new data segments (the transmission continues with a reduced congestion window CWND).

The above-mentioned two algorithms (fast re-transmit algorithm and fast recovery algorithm) are set up jointly as follows on the TCP server:

1. Upon reception of a third duplicate ACK, the value SSTHRESH is modified so as not as exceed the following maximum value:

$$SSTHRESH=\max(FlightSize/2, 2*MSS)$$

where:
   the value "flightsize" gives an estimation of the packets in transit whose server has not yet received the acknowledgement from the client;
   the value MSS indicates the maximum quantity of TCP data per IP datagram that the local system can accept on the transmission path.

2. Re-transmission of the segment deemed to be lost and updating of the congestion window CWND at (SSTHRESH+3*MSS). This increases the congestion window by the number of segments (3) that have gone out on the network and been received correctly by the client.

3. For each new duplicate ACK received by the server, there is an increase in the congestion window CWND by 1*MSS.

4. Transmission of a data segment if permitted by the new value of the congestion window CWND and by the value of the acknowledgement window ("advertised window") indicated by the client.

5. Upon reception of the next ACK which acknowledges the reception by the client of the data segment at the origin of the re-transmission, there is a lowering of the congestion window CWND to the value SSTHRESH computed at the step 1. This ACK message has of course arrived before 1 RTT after the re-transmission (or even far earlier if the cause of the problem had been an out-of-order delivery of the data segments to the client). There is then a phase of congestion avoidance because the TCP bit rate has fallen to half of the bit rate that prevailed when the loss had taken place.

The Most Common TCP Options

Selective Acknowledgments (SACKs)

The SACK option is a TCP protocol option used to implement a policy of selective re-transmission [RFC2018]. This option is aimed at offering more in-depth information for the recovery of losses. Indeed, the cumulative positive ACKs give limited information, and a TCP source learns of the existence of only one packet loss per RTT. The SACK extension gives the TCP protocol means of going beyond this limitation.

The SACK mechanism is implemented as soon as the receiver (client) perceives a break in sequence in the TCP stream. The receiver then sends the sender back a selective acknowledgement (selective ACK) containing the last byte number received in sequence (traditional ACK field of the TCP entity) and a list of correctly received contiguous ranges of bytes used to indicate the position of the last breaks in sequence observed in the current window.

The selective acknowledgements [according to RFC2018] are used to overcome the loss of several segments per window without the need to perform one or more round-trips per loss.

"Limited Transmit" Algorithm

As described further above, a re-transmission for a given segment is performed after reception of three duplicate ACKs. Should there be other losses for the following segments, this will take up one more RTT before reception of a correct ACK with the last contiguous sequence number received. Three other duplicate ACKs will be needed for it to be realized that the identified segment has been lost.

Depending on the current CWND window, it may happen that the server is not allowed to send a sufficient number of data segments for the generation of all the duplicate ACKs necessary.

The RTO will therefore expire and the server will go into slow-start mode.

The standard RFC3042 (Enhancing TCP's Loss Recovery Using Limited Transmit) is aimed at reducing the number of these timeouts. The limited transmit algorithm therefore recommends that the server send a data segment for each of the last two duplicate ACKs received. This method increases the probability that a client will be able to send the three duplicate ACKs necessary for the notification of an error.

The limited transmit mechanism can be used to in conjunction with or in isolation from the SACK mechanism.

The invention claimed is:

1. A method for managing a transmission of data streams on a transport channel of a tunnel, the transmission of each stream being performed on said transport channel according to a transport protocol scheduled by packets and with acknowledgment, the tunnel being implemented between a first and a second tunnel end-point connected respectively to a first and a second sub-network, each stream being transmitted from a sender device to a receiver device, one device among said sender device and said receiver device being connected to the first sub-network and the other to the second sub-network, said method being performed by said first tunnel end-point and comprising the following steps:

detecting a loss of packet on the transport channel of the tunnel;

identifying at least one stream having at least one packet blocked on the transport channel of the tunnel by said loss; and for at least one identified stream, generating and transmitting at least one acknowledgment to the sender device that has transmitted, on the tunnel, a packet blocked by said loss, said sender device re-initializing its retransmission timeout (RTO) upon reception of said at least one acknowledgement.

2. The method according to claim 1, wherein, for at least one given identified stream, said at least one generated acknowledgment is an acknowledgment of the packet that precedes the first packet, which is blocked by said loss, of said identified stream, and wherein, for the identified stream to which the packet whose loss has been detected belongs, the first packet blocked by said loss is considered to be a packet re-transmitted on the transport channel of the tunnel following the detection of the loss.

3. The method according to claim 1, wherein, for at least one given identified stream, said step of generating and transmitting at least one acknowledgment comprises the following steps:

determining a first sending instant t1 of sending a first acknowledgment, as a function of an estimation of the duration of a re-transmission time-out associated with the sender device transmitting said given identified stream, and as a function of a processing instant of processing, by said tunnel end-point, of said packet that precedes the first packet of said identified stream which is blocked by said loss; and transmitting said first acknowledgment at said first sending instant t1.

4. The method according to claim 3, wherein said first sending instant t1 is defined by: $t1=t0+RTO'-\Delta$, where:

t0 is said processing instant of processing, in said first tunnel end-point, of said packet that precedes the first packet of said identified stream which is blocked by said loss;

RTO' is said estimation of a duration of the re-transmission time-out associated with the sender device transmitting said given identified stream; and $\Delta$ is a pre-determined safety margin.

5. The method according to claim 4, wherein, for at least one given identified stream, said step of generating and transmitting at least one acknowledgment comprises at least one iteration of the following steps:

determining a new sending instant t2 of sending a new acknowledgment, defined by: $t2=t1+RTO'-\Delta$, where t1 is said first sending instant, for the first iteration, or the new sending instant t2 determined at the preceding iteration, for each iteration starting with the second iteration; and transmitting said new acknowledgment at said new sending instant t2.

6. The method according to claim 4, wherein: $RTO'=2*RTT$, with RTT being a measurement of a round-trip duration on the tunnel.

7. The method according to claim 1, wherein, for at least one given identified stream, in said step of generating and transmitting at least one acknowledgment, an acknowledgment is generated and transmitted only if the following condition is verified: the number of packets of said given identified stream, which are in transit on the transport channel of the tunnel and blocked by said loss, is greater than a number of acknowledgments generated and transmitted by said first tunnel end-point for said given identified stream.

8. The method according to claim 1, wherein, for at least one given identified stream, in said step of generating and transmitting at least one acknowledgment, an acknowledgment is generated and transmitted only if the following condition is verified: a number of acknowledgments generated and transmitted by said first tunnel end-point, for said given identified stream, is smaller than or equal to a pre-determined threshold indicating a packet loss for the sender device transmitting said given identified stream.

9. The method according to claim 1, wherein, for at least one given identified stream, it comprises a step of filtering acknowledgments coming via the tunnel, from the receiver device of said given identified stream, for which said first tunnel end-point has already generated and transmitted an acknowledgment.

10. A non-transitory computer-readable storage medium, storing a computer program comprising a set of instructions executable by a computer in order to implement a method for managing a transmission of data streams on a transport channel of a tunnel, the transmission of each stream being performed on said transport channel according to a transport protocol scheduled by packets and with acknowledgment, the tunnel being implemented between a first and a second tunnel end-point connected respectively to a first and a second sub-network, each stream being transmitted from a sender device to a receiver device, one device among said sender device and said receiver device being connected to the first sub-network and the other to the second sub-network, said method being performed by said first tunnel end-point and comprising the following steps:

detecting a loss of packet on the transport channel of the tunnel;

identifying at least one stream having at least one packet blocked on the transport channel of the tunnel by said loss; and for at least one identified stream, generating and transmitting at least one acknowledgment to the sender device that has transmitted, on the tunnel, a packet blocked by said loss, said sender device re-initializing its retransmission timeout (RTO) upon reception of said at least one acknowledgement.

11. A first tunnel end-point enabling the management of a transmission of data streams on a transport channel of a tunnel, the transmission of each stream being performed on said transport channel according to a transport protocol scheduled by packets and with acknowledgment, said tunnel being implemented between said first tunnel end-point and a second tunnel end-point connected respectively to a first and a second sub-network, each stream being transmitted from a sender device to a receiver device, one device among said sender device and said receiver device being connected to the first sub-network and the other to the second sub-network, wherein said first tunnel end-point comprises:

a processor; and a memory medium on which is stored a code of a computer program that, when executed by the processor, performs the steps of:

detecting a loss of packet on the transport channel of the tunnel;

identifying at least one stream having at least one packet blocked on the transport channel of the tunnel by said loss; and generating and transmitting, for at least one identified stream, at least one acknowledgment to the sender device that has transmitted, on the tunnel, a packet blocked by said loss, said sender device re-initializing its retransmission timeout (RTO) upon reception of said at least one acknowledgement.

12. The first tunnel end-point according to claim 11, wherein, for at least one given identified stream, said at least one generated acknowledgment is an acknowledgment of the packet that precedes the first packet, which is blocked by said loss, of said identified stream, and wherein, for the identified stream to which the packet whose loss has been detected belongs, the first packet blocked by said loss is considered to be a packet re-transmitted on the transport channel of the tunnel following the detection of the loss.

13. The first tunnel end-point according to claim 11, wherein said generating and transmitting at least one acknowledgment comprises:

determining, for at least one given identified stream, a first sending instant t1 of sending a first acknowledgment, as a function of an estimation of the duration of a re-transmission time-out associated with the sender device transmitting said given identified stream, and as a function of a processing instant of processing, by said tunnel end-point, of said packet that precedes the first packet of said identified stream which is blocked by said loss; and transmitting said first acknowledgment at said first sending instant t1.

14. The first tunnel end-point according to claim 13, wherein said first sending instant t1 is defined by: $t1=t0+RTO'-\Delta$, where:

t0 is said instant of processing, in said first tunnel end-point, of said packet that precedes the first packet of said identified stream which is blocked by said loss;

RTO' is said estimation of a duration of the re-transmission time-out associated with the sender device transmitting said given identified stream; and $\Delta$ is a pre-determined safety margin.

15. The first tunnel end-point according to claim 14, wherein said generating and transmitting at least one acknowledgment comprise the following, activated at least once:

determining, for at least one identified stream, a new sending instant t2 of sending a new acknowledgment, defined by: $t2=t1+RTO'-\Delta$, where t1 is said first sending instant, for the first iteration, or the new sending instant t2 determined at the preceding iteration, for each iteration starting with the second iteration; and transmitting said new acknowledgment at said new sending instant t2.

16. The first tunnel end-point according to claim 14, wherein: $RTO'=2*RTT$, with RTT being a measurement of a round-trip duration on the tunnel.

17. The first tunnel end-point according to claim 11, further comprising:

verifying the following condition for at least one given identified stream: the number of packets of said given identified stream, which are in transit on the transport channel of the tunnel and blocked by said loss, is greater than a number of acknowledgments generated and transmitted by said first tunnel end-point for said given identified stream; and activating said generating and transmitting at least one acknowledgment, for said at least one given identified stream, if said first verifying makes a positive verification.

18. The first tunnel end-point according to claim 11, further comprising:

verifying the following condition for at least one given identified stream: a number of acknowledgments generated and transmitted by said first tunnel end-point, for said given identified stream, is smaller than or equal to a pre-determined threshold indicating a packet loss for the sender device transmitting said given identified stream; and activating said generating and transmitting at least one acknowledgment, for said at least one given identified stream, if said verifying makes a positive verification.

19. The first tunnel end-point according to claim 11, further comprising, for at least one given identified stream, filtering the acknowledgments coming via the tunnel, from the receiver device of said given identified stream, for which said first tunnel end-point has already generated and transmitted an acknowledgment.

\* \* \* \* \*